(12) United States Patent
Pavlovski et al.

(10) Patent No.: US 10,401,890 B2
(45) Date of Patent: Sep. 3, 2019

(54) UTILITY GRID, INTERMITTENT ENERGY MANAGEMENT SYSTEM

(71) Applicant: GREEN POWER LABS INC., Dartmouth (CA)

(72) Inventors: Alexandre Pavlovski, Bedford (CA); Dmitriy Anichkov, Somerville, NJ (US)

(73) Assignee: GREEN POWER LABS INC., Dartmouth, NS (CA)

( * ) Notice: Subject to any disclaimer, the term of this patent is extended or adjusted under 35 U.S.C. 154(b) by 261 days.

(21) Appl. No.: 15/102,963

(22) PCT Filed: Dec. 22, 2014

(86) PCT No.: PCT/US2014/071944
§ 371 (c)(1),
(2) Date: Jun. 9, 2016

(87) PCT Pub. No.: WO2015/100256
PCT Pub. Date: Jul. 2, 2015

(65) Prior Publication Data
US 2017/0003700 A1 Jan. 5, 2017

Related U.S. Application Data

(60) Provisional application No. 61/921,077, filed on Dec. 26, 2013.

(51) Int. Cl.
*G05F 1/66* (2006.01)
*G06Q 50/06* (2012.01)
(Continued)

(52) U.S. Cl.
CPC .............. *G05F 1/66* (2013.01); *G06Q 50/06* (2013.01); *H02J 3/24* (2013.01); *H02J 3/386* (2013.01);
(Continued)

(58) Field of Classification Search
CPC ............ G05B 2219/40458; G05F 1/66; G06Q 50/06; H02J 13/00; H02J 2003/003;
(Continued)

(56) References Cited

U.S. PATENT DOCUMENTS 7,199,482 B2 * 4/2007 Hopewell ............... H02J 3/383
290/44
8,600,572 B2 12/2013 Sri-Jayantha
(Continued)

FOREIGN PATENT DOCUMENTS

EP 1739824 3/2007
EP 2381094 10/2011

OTHER PUBLICATIONS

European search report for EP14875443 dated May 2, 2017.
(Continued)

*Primary Examiner* — Abdelmoniem I Elamin

(57) ABSTRACT

A method for controlling an operating condition of an electric power grid, the electric power grid having an intermittent power supply coupled thereto, the method comprising: using an energy variability controller, controlling variability of a delivered power output of the intermittent power supply to the electric power grid by: monitoring an actual environmental value for a location proximate the intermittent power supply, an available power output of the intermittent power supply being dependent on the actual environmental value; when the actual environmental value is increasing and hence the available power output is increasing, increasing the delivered power output according to a predetermined rate of increase; monitoring a forecast environmental value for the location; when the forecast environmental value is decreasing, decreasing the delivered (Continued)

power output according to a predetermined rate of decrease; and, limiting the delivered power output to below a predetermined threshold.

26 Claims, 26 Drawing Sheets

(51) Int. Cl.
*H02J 3/24* (2006.01)
*H02J 3/38* (2006.01)
*H02J 13/00* (2006.01)
*H02J 3/00* (2006.01)

(52) U.S. Cl.
CPC .... *H02J 13/00* (2013.01); *G05B 2219/40458* (2013.01); *H02J 2003/003* (2013.01); *Y02E 10/763* (2013.01)

(58) Field of Classification Search
CPC ........... H02J 3/24; H02J 3/386; Y02E 10/763; Y04S 10/54
See application file for complete search history.

(56) References Cited

U.S. PATENT DOCUMENTS

| | | | |
|---|---|---|---|
| 8,606,416 B2 * | 12/2013 | Larsson | G06Q 10/04 700/22 |
| 9,020,650 B2 * | 4/2015 | Lutze | F03D 7/0284 700/287 |
| 10,079,317 B2 * | 9/2018 | Gonatas | H01L 31/02021 |
| 2008/0195255 A1 | 8/2008 | Lutze et al. | |
| 2008/0249665 A1 | 10/2008 | Emery et al. | |
| 2009/0240381 A1 | 9/2009 | Lane | |
| 2010/0145533 A1 | 6/2010 | Cardinal et al. | |
| 2011/0084551 A1 | 4/2011 | Johnson et al. | |
| 2011/0202191 A1 * | 8/2011 | Larsson | G06Q 10/04 700/287 |
| 2011/0276269 A1 * | 11/2011 | Hummel | H02J 3/383 702/3 |
| 2011/0307109 A1 | 12/2011 | Sri-Jayantha | |
| 2012/0200086 A1 * | 8/2012 | Kang | F03D 7/048 290/44 |
| 2013/0166084 A1 | 6/2013 | Sedighy et al. | |
| 2013/0184884 A1 | 7/2013 | More et al. | |
| 2014/0316592 A1 * | 10/2014 | Haj-Maharsi | F03D 7/0284 700/287 |

OTHER PUBLICATIONS

International Search Report in PCT/US2014/071944 dated Mar. 20, 2015.
Written Opinion in PCT/US2014/071944 dated Mar. 20, 2015.
Examination Report for Corresponding European Application No. EP 14 875 443.5, dated Jan. 15, 2018, 4 Pages.
EP 14875443.5 Examination Report, dated Sep. 14, 2018, 4 Pages.

* cited by examiner

UTILITY GRID, INTERMITTENT ENERGY MANAGEMENT SYSTEM

This application claims priority from and the benefit of the filing date of U.S. Provisional Patent Application No. 61/921,077, filed Dec. 26, 2013, and the entire content of such application is incorporated herein by reference.

FIELD OF THE INVENTION

This invention relates to the field of utility grid control, and more specifically, to a utility grid, an intermittent energy management system, and a method for managing operating conditions in a utility grid.

BACKGROUND OF THE INVENTION

Intermittent power plants use intermittent energy resources to generate electrical power using, for example, solar photovoltaic modules or wind turbines. However, variations in solar irradiation or wind speed cause variations in the power generated by intermittent power plants. This is referred to as energy variability. Energy variability may lead to variations in the voltage or frequency of electricity delivered to electricity consumption devices. A group of power plants, electricity consumption devices, and associated infrastructure spread over a geographical area may form an electric power grid or utility grid. Variations in power generated by intermittent power plants can cause variations in operating conditions in utility grids, including voltage and frequency, beyond their standard or desired ranges.

As mentioned above, a utility grid typically includes a plurality of power plants which are spread over a geographic area. The utility grid also typically includes electricity consumption devices as well as grid infrastructure, such as infrastructure for interconnection, control, maintenance, and/or improvement of the power plants, the electricity consumption devices, and/or any additional infrastructure. For example, the utility grid may include electrical distribution lines interconnecting the power plants, electricity consumption devices, and other devices within the utility grid.

Typically, operating conditions in the utility grid are managed by an energy management system. The utility grid's energy management system controls power plants that use continuous energy resources like coal, natural gas, oil or hydro as well as conventional control devices such as transformers, circuit breakers, capacitors, and reactors to keep the operating conditions within a desired range. The electricity parameters controlled by the energy management system, hereinafter referred to as operating conditions, may include active and reactive power, power factor, voltage, and frequency.

One problem with existing utility grids is that as the capacity of intermittent power plants in these grids grows, the ability of energy management systems to maintain operating conditions in these grids within desired ranges by adjusting the power generation of power plants that use continuous energy resources and/or by configuration of conventional control devices becomes limited. In turn, this limits the ability of the utility grid to accept economically and environmentally valuable power from intermittent power plants while maintaining grid stability and may result in additional wear on utility infrastructure and control devices such as distribution transformers. In particular, conventional control systems do not include adequate provisions aimed at managing operating conditions in utility grids that include intermittent power plants.

A need therefore exists for an improved utility grid, intermittent energy management system, and method for managing operating conditions in a utility grid. Accordingly, a solution that addresses, at least in part, the above and other shortcomings is desired.

SUMMARY OF THE INVENTION

According to one aspect of the invention, there is provided a method for controlling an operating condition of an electric power grid, the electric power grid having an intermittent power supply coupled thereto, the method comprising: using an energy variability controller, controlling variability of a delivered power output of the intermittent power supply to the electric power grid by: monitoring an actual environmental value for a location proximate the intermittent power supply, an available power output of the intermittent power supply being dependent on the actual environmental value; when the actual environmental value is increasing and hence the available power output is increasing, increasing the delivered power output according to a predetermined rate of increase; monitoring a forecast environmental value for the location; when the forecast environmental value is decreasing, decreasing the delivered power output according to a predetermined rate of decrease; and, limiting the delivered power output to below a predetermined threshold.

In accordance with further aspects of the invention, there is provided an apparatus such as a data processing system, an intermittent energy management system, and an energy variability controller, a method for adapting these, as well as articles of manufacture such as a computer readable medium or product and computer program product or software product (e.g., comprising a non-transitory medium) having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE EXEMPLARY EMBODIMENTS

In the following description, details are set forth to provide an understanding of the invention. In some instances, certain software, circuits, structures and methods have not been described or shown in detail in order not to obscure the invention. The term "data processing system" or "system" is used herein to refer to any machine for processing data, including the control systems, controllers, energy management systems, intermittent energy management systems, energy variability controllers, computer systems, and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware or in a combination of hardware and software.

Figure 25:
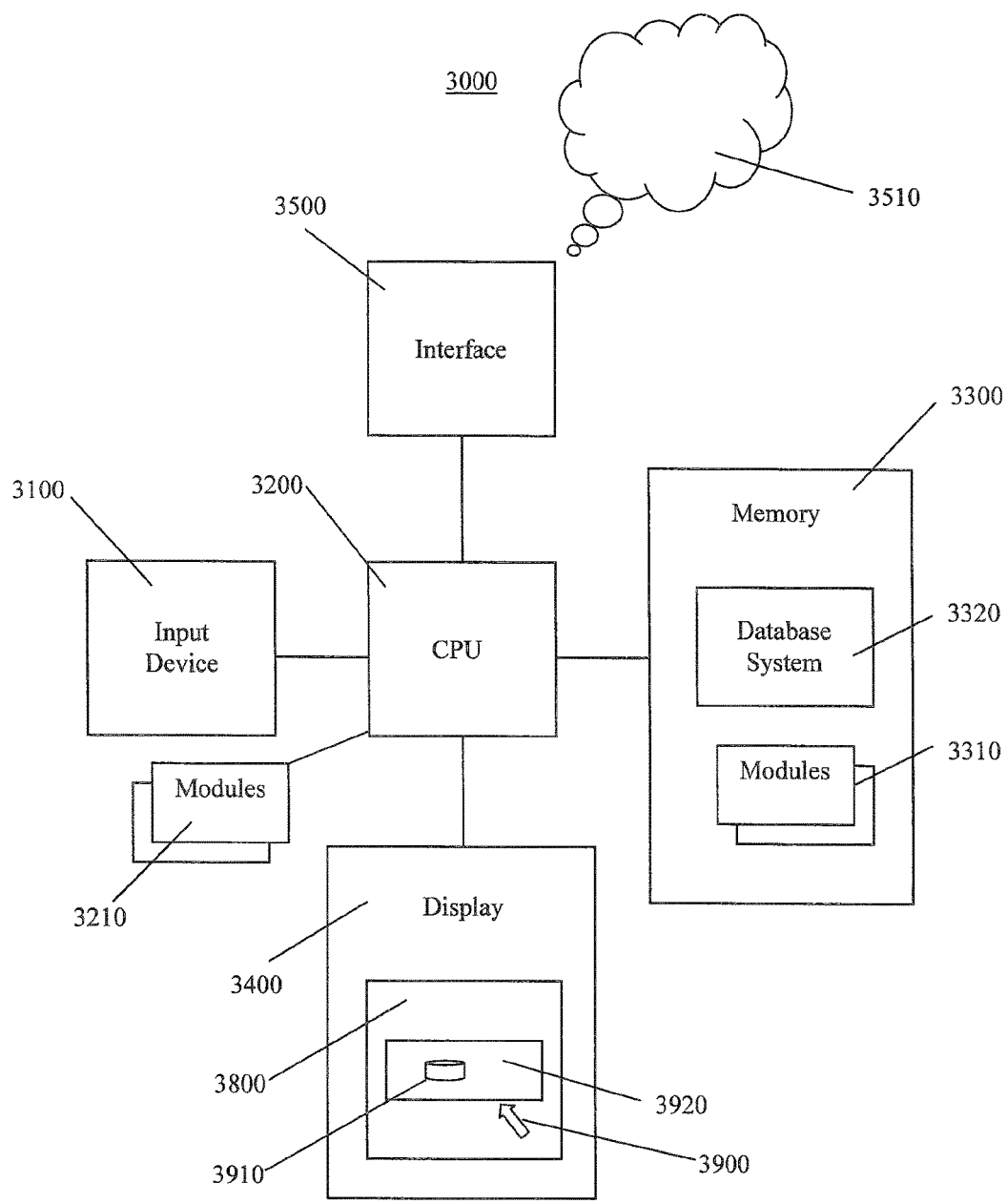
FIG. 25 is a block diagram illustrating a data processing system in accordance with an embodiment of the invention; and, FIG. 26 is a flow chart illustrating operations of modules within a data processing system for controlling an operating condition of an electric power grid, the electric power grid having an intermittent power supply coupled thereto, in accordance with an embodiment of the invention.

FIG. 25 is a block diagram illustrating a data processing system 3000 in accordance with an embodiment of the invention. The data processing system 3000 is suitable for monitoring and controlling a utility grid and for performing as a control system, control device, programmable logic controller ("PLC"), supervisory control and data acquisition ("SCADA"), energy management system ("EMS"), energy variability controller, intermittent power control device, intermittent energy management system, or the like. The data processing system 3000 is also suitable for data processing, management, storage, and for generating, displaying, and adjusting presentations in conjunction with a user interface or a graphical user interface ("GUI"), as described below. The data processing system 3000 may be a client and/or server in a client/server system. For example, the data processing system 3000 may be a server system or a personal computer ("PC") system. The data processing system 3000 may also be a distributed system which is deployed across multiple processors. The data processing system 3000 may also be a virtual machine. The data processing system 3000 includes an input device 3100, at least one central processing unit ("CPU") 3200, memory 3300, a display 3400, and an interface device 3500. The input device 3100 may include a keyboard, a mouse, a trackball, a touch sensitive surface or screen, a position tracking device, an eye tracking device, or a similar device. The display 3400 may include a computer screen, television screen, display screen, terminal device, a touch sensitive display surface or screen, or a hardcopy producing output device such as a printer or plotter. The memory 3300 may include a variety of storage devices including internal memory and external mass storage typically arranged in a hierarchy of storage as understood by those skilled in the art. For example, the memory 3300 may include databases, random access memory ("RAM"), read-only memory ("ROM"), flash memory, and/or disk devices. The interface device 3500 may include one or more network connections. The data processing system 3000 may be adapted for communicating with other data processing systems (e.g., similar to the data processing system 3000) over a network 3510 via the interface device 3500. For example, the interface device 3500 may include an interface to a network 3510 such as the Internet and/or another wired or wireless network (e.g., a wireless local area network ("WLAN"), a cellular telephone network, etc.). As such, the interface 3500 may include suitable transmitters, receivers, antennae, etc. Thus, the data processing system 3000 may be linked to other data processing systems by the network 3510. In addition, the interface device 3500 may include one or more input and output connections or points for connecting various sensors (e.g., $S_{GFREQ}$, $S_{400}$, $S_{200}$, $S_{ENVIRON}$), status (indication) inputs, analog (measured value) inputs, counter inputs, analog outputs, and control outputs to the data processing system 3000. The CPU 3200 may include or be operatively coupled to dedicated coprocessors, memory devices, or other hardware modules 3210. The CPU 3200 is operatively coupled to the memory 3300 which stores an operating system (e.g., 3310) for general management of the system 3000. The CPU 3200 is operatively coupled to the input device 3100 for receiving user commands or queries and for displaying the results of these commands or queries to the user on the display 3400. Commands and queries may also be received via the interface device 3500 and results may be transmitted via the interface device 3500. The data processing system 3000 may include a data store or database system 3320 for storing data and programming information. The database system 3320 may include a database management system (e.g., 3320) and a database (e.g., 3320) and may be stored in the memory 3300 of the data processing system 3000. In general, the data processing system 3000 has stored therein data representing sequences of instructions which when executed cause the method described herein to be performed. Of course, the data processing system 3000 may contain additional software and hardware a description of which is not necessary for understanding the invention.

Thus, the data processing system 3000 includes computer executable programmed instructions for directing the system 3000 to implement the embodiments of the present invention. The programmed instructions may be embodied in one or more hardware modules 3210 or software modules 3310 resident in the memory 3300 of the data processing system 3000 or elsewhere (e.g., 3200). Alternatively, the programmed instructions may be embodied on a computer readable medium or product (e.g., one or more digital video disks ("DVDs"), compact disks ("CDs"), memory sticks, etc.) which may be used for transporting the programmed instructions to the memory 3300 of the data processing system 3000. Alternatively, the programmed instructions may be embodied in a computer-readable signal or signal-bearing medium or product that is uploaded to a network 3510 by a vendor or supplier of the programmed instructions, and this signal or signal-bearing medium or product may be downloaded through an interface (e.g., 3500) to the data processing system 3000 from the network 3510 by end users or potential buyers.

A user may interact with the data processing system 3000 and its hardware and software modules 3210, 3310 using a user interface such as a graphical user interface ("GUI") 3800 (and related modules 3210, 3310). The GUI 3800 may be used for monitoring, managing, and accessing the data processing system 3000. GUIs are supported by common operating systems and provide a display format which enables a user to choose commands, execute application programs, manage computer files, and perform other functions by selecting pictorial representations known as icons, or items from a menu through use of an input device 3100 such as a mouse. In general, a GUI is used to convey information to and receive commands from users and generally includes a variety of GUI objects or controls, including icons, toolbars, drop-down menus, text, dialog boxes, buttons, and the like. A user typically interacts with a GUI 3800 presented on a display 3400 by using an input device (e.g., a mouse) 3100 to position a pointer or cursor 3900 over an object (e.g., an icon) 3910 and by selecting or "clicking" on the object 3910. Typically, a GUI based system presents application, system status, and other information to the user in one or more "windows" appearing on the display 3400. A window 3920 is a more or less rectangular area within the display 34000 in which a user may view an application or a document. Such a window 3920 may be open, closed, displayed full screen, reduced to an icon, increased or reduced in size, or moved to different areas of the display 3400. Multiple windows may be displayed simultaneously, such as: windows included within other windows, windows overlapping other windows, or windows tiled within the display area.

Figure 1:
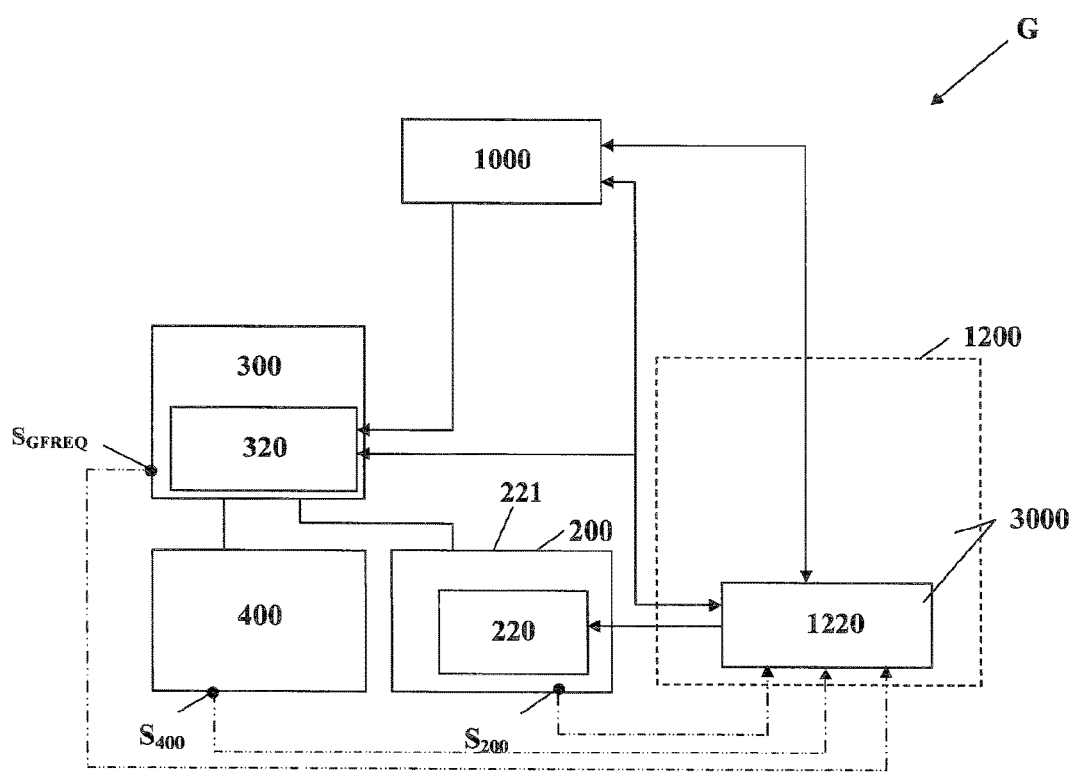
FIG. 1 is a block diagram illustrating a utility grid in accordance with an embodiment of the invention.

FIG. 1 is a block diagram illustrating a utility grid G in accordance with an embodiment of the invention. According to one embodiment of the invention, there is provided a method for controlling the power output variability of an intermittent power supply or system 200 in an electric power grid or utility grid G, the electric power grid or utility grid G including the intermittent power supply 200, a continuous power supply or system 300, and a power consumption system 400. It will be understood by those of skill in the art that a utility gird G typically includes a plurality of power plants or supplies 200, 300 and power consumers or systems 400.

The electric power grid, utility grid, or grid G includes one or more intermittent power supplies 200 that may use intermittent energy resources to generate electrical power at power plants using, for example, solar photovoltaic modules or wind turbines, and may be referred to as intermittent power plants herein. The grid G further includes one or more continuous power supplies 300 that may be power plants that use continuous energy resources like coal, natural gas, oil, or hydro to generate electrical power. The grid G further includes one or more power consumption systems 400 that may be one or a cluster of residential and/or commercial buildings, a municipal or industrial electrical load, a controllable load, or the like. Thus, as one of skill in the art will understand, the grid G typically includes a group of power plants 200, 300, electricity consumption devices 400, and associated infrastructure spread over a geographical area. The infrastructure of the grid G may include infrastructure for interconnection, control, maintenance, and/or improvement of the power plants 200, 300, the electricity consumption devices 400, and/or any infrastructure of the grid G. For example, the grid G may include electrical distribution lines interconnecting the power plants, electricity consumption devices within the grid, any infrastructure within the grid, and/or any combination thereof. As described above, variations in power generated by intermittent power plants 200 may cause variations in operating conditions such as voltage and frequency in the utility grid G beyond their standard or desired ranges.

Typically, operating conditions in the utility grid G are managed by an energy management system 1000. The energy management system 1000 may be configured similarly to the data processing system 3000 described above. The utility grid's energy management system 1000 controls the continuous power supply 300, that may include power plants that use continuous energy resources like coal, natural gas, oil, or hydro as well as conventional control devices 320 such as transformers, circuit breakers, capacitors, and reactors to keep the operating conditions in a desired range. Operating conditions controlled by the energy management system 1000 may include, but are not limited to, active and reactive power, power factor, voltage, and frequency.

As the capacity of intermittent power supplies 200 in a utility grid G continues to grow, the ability of the energy management system 1000 to maintain operating conditions in the grid G in the desired ranges by adjusting the power generation of power plants 300 that use continuous energy resources and/or a configuration of conventional control devices 320 becomes limited. In turn, this limits the ability of the utility grid G to accept economically and environmentally valuable power from intermittent power plants 200 while maintaining grid stability and may result in additional wear on utility infrastructure and control devices such as distribution transformers.

Referring again to FIG. 1, the utility grid G includes an energy management system 1000 that manages generation and consumption within the grid G. In FIG. 1, only part of the grid G is shown in detail while most of the grid G structure is schematically represented by reference numeral 300 including not only the continuous power supply 300 but other grid G components. It will be understood by those skilled in the art that this part of the grid G includes one or more of the continuous power supplies 300 along with a plurality of power lines, electricity consumption devices 400, and the like. Specifically, this part of the grid G includes a conventional power control device 320. The conventional power control device 320 may be a distribution transformer, capacitor bank, reactor bank, static VAR compensator, or other conventional power control devices. Furthermore, it will be understood by those skilled in the art that a plurality of additional conventional power control devices 320 may be provided instead of only a single device.

The utility grid G further includes at least one power consumption system or device 400. The at least one consumption device 400 may be one or a cluster of residential and/or commercial buildings, a municipal or industrial electrical load of any kind, a controllable load, or the like. The grid G further includes an intermittent power supply or system 200. In FIG. 1, the intermittent power supply 200 is not limited to a specific intermittent energy resource like solar or wind for generating electricity. It will be understood by those skilled in the art that the intermittent power supply 200 may include a single solar power plant or wind power plant or multiple solar and/or wind power plants of any size connected to the grid G, or other power plants using intermittent energy resources like in-stream hydro, wave, tidal, or any other hybrid power plant using intermittent energy resources. Also, it will be understood by those of skill in the art that the intermittent power supply 200 may include a power plant that uses any energy source that exhibits intermittent electricity generation behavior, i.e., that produces a fluctuating power output.

Furthermore, the utility grid G includes an intermittent power control device 220 that is configured to control the output of the intermittent power supply 200. Typically, an intermittent power control device 220 is an integral part of a power conditioning device such as inverter, however, it may also be realized as a stand-alone device. The intermittent power control device 220 may be realized as a programmable microcontroller or alternatively by other suitable hardware and/or software solutions. The intermittent power control device 220 may be configured similarly to the data processing system 3000 described above. The intermittent power control device 220 responds to commands related to the operating conditions of the intermittent power supply 200. It will be understood by those skilled in the art that the term "operating conditions" includes, but is not limited to, active and reactive power, power factor, voltage, and frequency.

Accordingly, the intermittent power supply 200 may also be called upon to provide a certain amount of reactive power to the grid G. In this event, the intermittent power control device 220 adjusts the intermittent power supply 200 to provide a sufficient amount of reactive power. Furthermore, the intermittent power control device 220 and the conventional power control device 320 are configured to maintain operating conditions in the utility grid G in a desired range. Again, it will be understood by those skilled in the art that the term "operating conditions" includes, but is not limited to voltage, frequency, and power factor.

The utility grid G further includes an intermittent energy management system 1200. The intermittent energy management system 1200 manages energy variability in the utility grid G. The intermittent energy management system 1200 may be configured similarly to the data processing system 3000 described above. According to one embodiment, the intermittent energy management system 1200 may include the energy variability controller 1220.

Referring again to FIG. 1, the energy variability controller 1220 is communicatively coupled to the energy management system 1000. The energy management system 1000 is configured to request that operating conditions of the intermittent power supply 200 be set at a desired level or in a desired range. The energy variability controller 1220 ensures that grid components such as distributed generators, controllable loads, battery storage ("DG"), electrical connection systems, and switchgear are operating in a coordinated, safe, and optimal manner to deliver high quality power and energy to the grid G.

The energy variability controller 1220 may be part of the intermittent energy management system 1200 and may be configured to accept a real-time indication (e.g., via communications signals) from the energy management system 1000. Based on an indication from energy management system 1000, the energy variability controller 1220 may apply one or more control functions including, but not limited to, curtailment, ramp-up and ramp-down control, delta control, frequency control, and automatic voltage regulation to optimize the use of the conventional power control device 320 and the intermittent power control device 220 while maintaining operating conditions in the grid G within a desired range.

The energy variability controller 1220 may execute control of the conventional power control devices 320 and intermittent power control devices 220 and may provide individual control signals to all or some of the control devices 220, 320 within the utility grid G, or within a part of the grid G, that establishes values for active and reactive power for each controlled intermittent power plant 200. Using these control signals, the control devices 220, 320 change the operating conditions of the utility grid G so as to maintain these conditions in a desired range. It will be understood by those skilled in the art that the energy variability controller 1220 may control one or a number of intermittent power plants 200 connected to power grid G via their respective intermittent power control devices 220.

The energy variability controller 1220 may send control commands to the energy management system 1000 that in turn may communicate commands to the conventional power control devices 320. Alternatively, the controller 1220 may send commands to the conventional power control devices 320 directly over a communication link or network 3510. Furthermore, the controller 1220 may control the intermittent power control devices 220 responding to the target signals communicated to the controller 1220 from the energy management system 1000 in an open-loop control mode. The controller 1220 may also control the intermittent power control devices 220 via the energy management system 1000.

In addition to the open-loop control mode described above, the controller 1220 may also implement closed-loop control. In a closed-loop mode, the controller 1220 automatically changes the commands sent to the intermittent power supply 200 based on the difference between feedback signals and target signals. In this control mode, the controller 1220 will acquire utility grid G measurements including, but not limited to, active power, reactive power, power factor, rate of change of power, frequency, voltage, current, or various combinations of these variables. One or more of these measurements may be used as feedback signals for closed-loop control.

Power plant measurements are typically referred to the plant's output terminals. The controller 1220 may acquire these measurements from the energy management system 1000 or alternatively from the intermittent power supply 200 over a communications link or network 3510. If the measurements are acquired by the controller 1220 from the intermittent power supply 200, they may be communicated to the energy management system 1000 for monitoring purposes.

The energy variability controller 1220 may operate as a closed-loop regulator that controls one or more operating conditions at least partially based on at least one variable indicative of the present condition of the utility grid G. As such, the energy variability controller 1220 is typically communicative with at least one sensor for measuring at least one grid variable ("GV"), so that control may be at least partially based on the value of at least one grid variable measured by the sensor. In the embodiment of FIG. 1, the controller 1220 is communicative with a sensor $S_{200}$ for sensing the power output of the intermittent power supply 200, a sensor $S_{GFREQ}$ for measuring grid frequency, and a sensor $S_{400}$ measuring power demand of the electricity consumption device or system 400. However, it will be understood by those skilled in the art that the sensors $S_{200}$, $S_{GFREQ}$, and $S_{400}$ may measure one or more of the aforementioned grid variables. Furthermore, the controller 1220 may be provided with additional grid sensors for measuring additional grid variables.

The controller 1220 may control some of the operating conditions in closed-loop mode and other operating conditions in open-loop mode in many combinations. The energy management system 1000 may command the controller 1220 to transfer control mode from open-loop to closed-loop and back.

The controller 1220 of FIG. 1 may control operating conditions at a control point on the utility grid G different than the measurement point. The controller 1220 may implement a grid model to calculate the operating conditions at the control point. The grid model may use measurements at the measurement point to calculate a control parameter at the control point. The controller 1220 may use multiple measurement points and multiple control points on the utility grid G. A grid model output may be used by the controller 1220 to control operating conditions at one or multiple control points described above in open-loop control mode or closed-loop control mode. Further, the grid model may be used to implement adaptive learning.

Thus, the application of one or more energy variability controllers 1220 facilitates control of the utility grid G and management of its operating conditions. In particular, operations of conventional power control devices 320 like power substation transformers may be reduced thus improving the reliability of their performance and increasing their longevity. Typically, the power output of intermittent power plants 200 may be highly fluctuating due to the intermittency of the energy resources they use (e.g., the impact of intermittent cloudiness on a solar energy resource or wind gusts on a wind energy resource).

Figure 21:
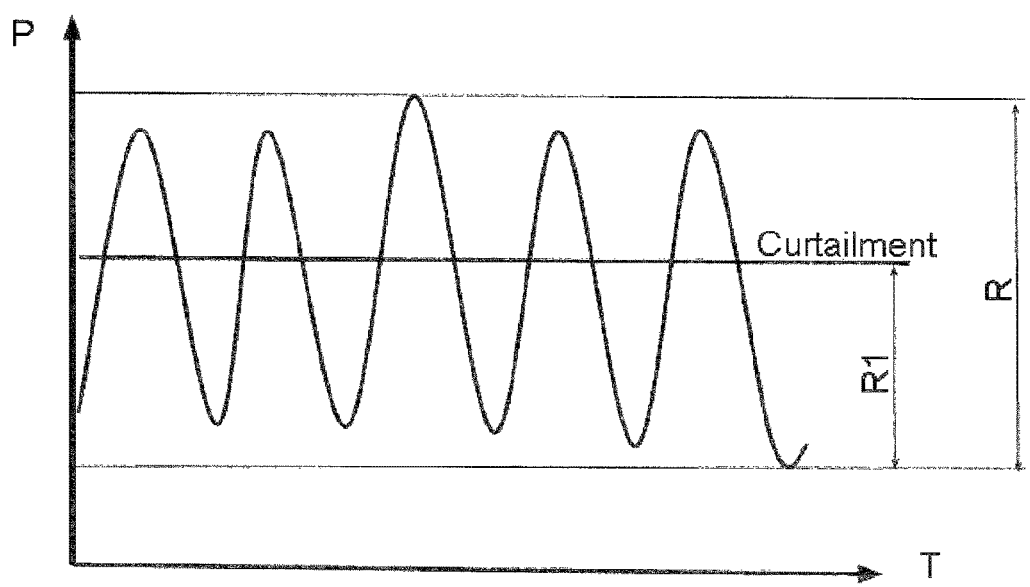
FIG. 21 is a graph illustrating power curtailment in accordance with an embodiment of the invention.
Figure 22:
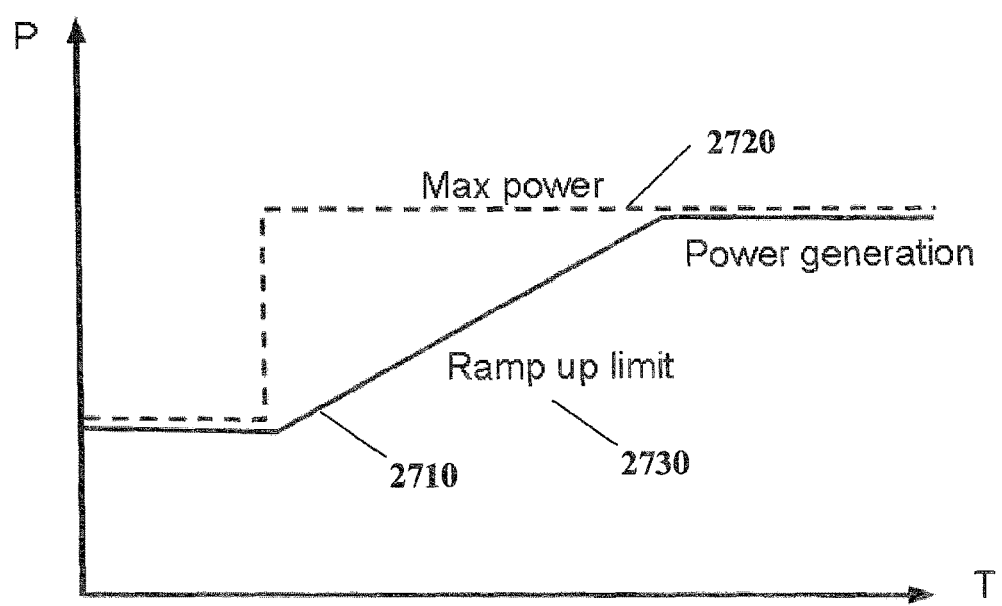
FIG. 22 is a graph illustrating ramp-up control in accordance with an embodiment of the invention.
Figure 23:
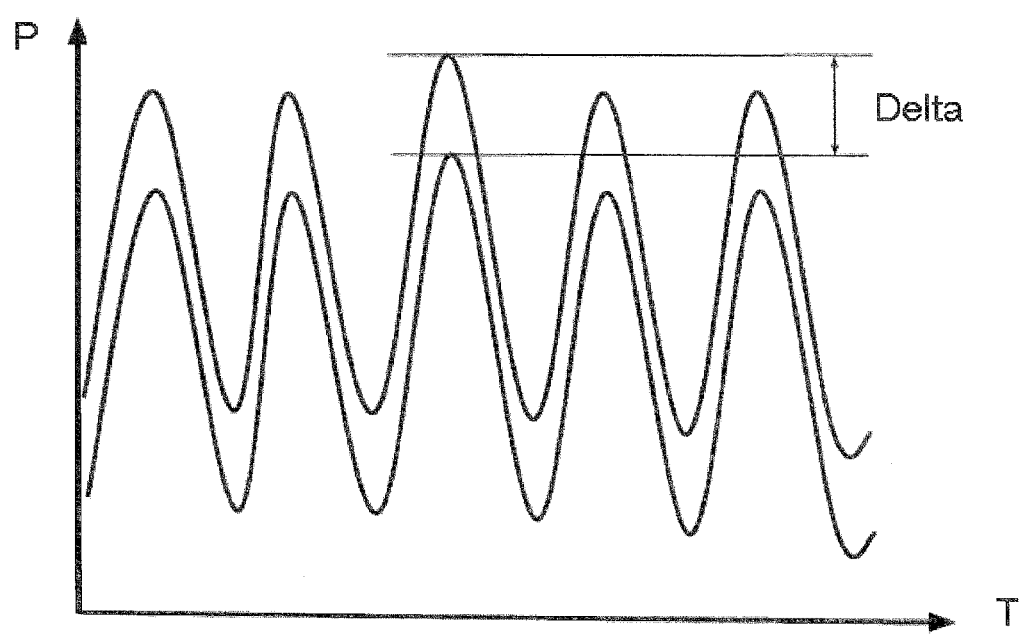
FIG. 23 is a graph illustrating delta control in accordance with an embodiment of the invention.
Figure 24:
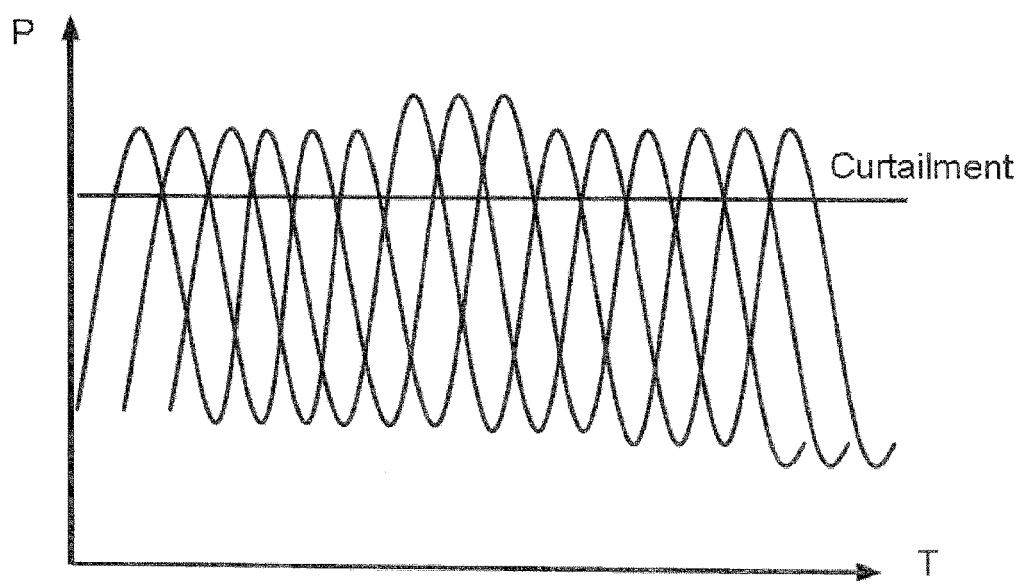
FIG. 24 is a graph illustrating distributed generation curtailment in accordance with an embodiment of the invention.

FIG. 21 is a graph illustrating power curtailment in accordance with an embodiment of the invention. FIG. 22 is a graph illustrating ramp-up control in accordance with an embodiment of the invention. FIG. 23 is a graph illustrating delta control in accordance with an embodiment of the invention. And, FIG. 24 is a graph illustrating distributed generation curtailment in accordance with an embodiment of the invention.

According to one embodiment, the intermittent energy management system 1200 and/or the energy variability controller 1220 may be used to implement intermittency or variability management. Intermittency or variability management is configured to perform or address the following. First, to maintain frequency deviation from the nominal below a certain limit (statistical measure) by lowering intermittent generation variability by control means as described above. This function may work in concert with frequency control. Second, to improve power quality maintaining voltage variation within certain limits. This is performed by controlling generation variability by means of intermittency control. This function may work in concert with voltage control, power factor control, and reactive power control. Third, optimize system operations. Higher voltage or reactive power variability causes capacitors, reactors, and on-load tap changers to operate more frequently to maintain these parameters within acceptable limits. Conventional generation has to compensate for the variability. However, conventional generation is less efficient if ramped up and down and may have a larger environmental impact. On the other hand, intermittency control may cause loses in renewable power generation. Optimization related functions are configured to lower operational costs with respect to these issues. Intermittency or variability may be managed by means including curtailment, ramp-up and down control, delta control, frequency control, and automatic voltage regulation.

Referring to FIG. 21, power curtailment provides reduction in active power to satisfy grid authority requirements and/or to decrease generation variability. The graph in FIG. 21 illustrates generation variability management by means of power curtailment where P is the maximum active power generation over time T, R is the generation range caused by power resource variability, and R1 is the curtailed generation range (or predetermined threshold of delivered power output). As R1 is less than R, it can be seen that curtailment decreases generation variability.

Referring to FIG. 22, ramp-up control limits the rate of generation change caused by a power resource increase. Generation variability R is controlled by changing a ramp-up limit value (or rate of increase) 2730 between a delivered power output 2710 and an available power output 2720. Ramp-down control limits the rate of generation change when a solar or wind resource is decreasing. This is accomplished by: forecasting the available resource for multiple horizons; defining a maximum (or available) power of the generating asset based on the forecasts; defining a power down ramp based on the maximum power forecasts; defining time periods when the ramps exceed predefined limits; and, curtailing generating assets in accordance with the defined ramp down rate in advance of unacceptable ramps.

Referring to FIG. 23, delta control provides for curtailment of generation below maximum capability for current operating conditions. Capability reserve may be used for up-regulation during a low frequency event, or reactive power injection. An increase in delta increases spinning reserve and decreases process variability.

Referring to FIG. 24, distributed generation curtailment allows for curtailment of distributed generators to decrease variability and maintain spinning reserve.

By applying power curtailment, ramp-up and ramp-down control, and other control functions to the intermittent power supply 200, the operating conditions of the utility grid G may be maintained within desired ranges without frequent changes in the operation of conventional control devices. Furthermore, the impact of fluctuations in electricity consumption (i.e., power demand) on the operating conditions of the grid G may be reduced by dynamically managing the operating conditions of the intermittent power supply 200 using the intermittent energy management system 1200 and/or energy variability controller 1220. Advantageously, the present invention allows a utility grid G to accept electric power available from an intermittent power supply 200 while maintaining operating conditions with respect to grid parameters in a desired range and reducing additional wear and suboptimal operation of the grid G attributable to intermittent energy generation.

The controller 1220 may decrease variability by means of power curtailment as described above. Variability of an energy resource, for example, solar irradiance, causes variability of the active power generated. Decreasing a curtailment target will decrease active power variability while increasing the curtailment target will increase active power variability for time periods with constant irradiance variability. Thus, by using power curtailment, the controller 1220 may manage energy variability and operating conditions in the grid G.

The controller 1220 may also decrease variability by limiting ramp rates as described above. The controller 1220 may lower active power variability by limiting an active power ramp-up rate. The variability decreases with a decreased ramp rate limit and increases with an increased ramp rate limit. Consequently, the controller 1220 may manage energy variability by decreasing and increasing the ramp rate limit of the controlled parameters.

The controller 1220 may also use delta control to manage energy variability and operating conditions in the grid G as described above. Delta control provides a power reserve that may be used, for example, for grid frequency control. In the event of under-frequency, frequency control may use a power reserve to increase active power generation to lower frequency deviation from the nominal and consequently to lower frequency variability. Similarly, the reserve may be used to change reactive power generation to support grid voltage during voltage sags or swells.

The controller 1220 may also use a statistical measure of energy variability to manage energy variability and operating conditions in the grid G. For example, to measure frequency deviations, the controller 1220 may use control performance standard ("CPS") factors 1 and 2, or other statistical measures. The controller 1220 may implement closed-loop control to manage energy variability. In this mode, the controller 1220 may automatically change the commands described above based on a difference between feedback measured variability signals and target variability signals. The target variability may be sent to the controller 1220 from the energy management system 1000.

Figure 2:
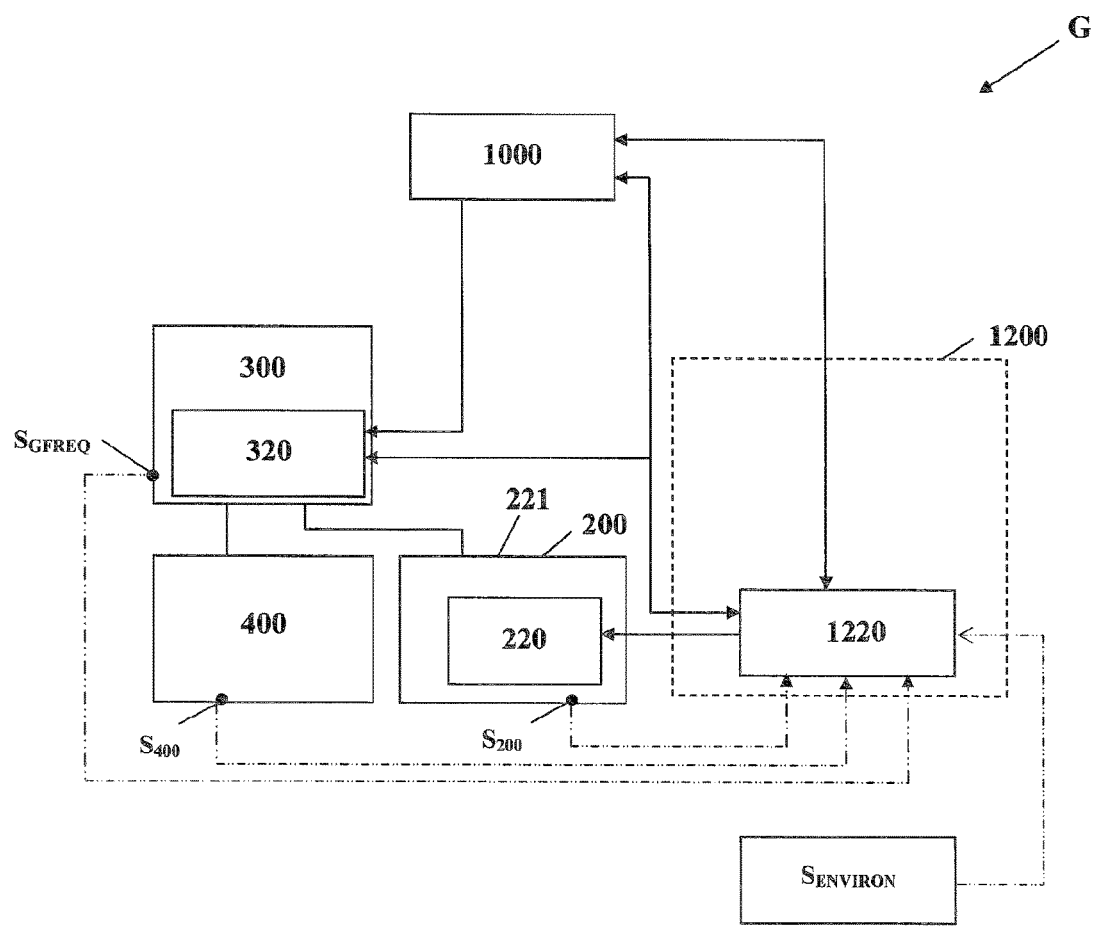
FIG. 2 is a block diagram illustrating a utility grid in accordance with another embodiment of the invention.

FIG. 2 is a block diagram illustrating a utility grid G in accordance with another embodiment of the invention. The basic configuration of utility grid G in FIG. 2 is similar to the grid G shown in FIG. 1. However, in FIG. 2, the energy variability controller 1220 is communicative with at least one sensor $S_{ENVIRON}$ which is indicative of at least one environmental condition. For example, an actual environmental value may be monitored by the sensor $S_{ENVIRON}$. The controller 1220 is configured to control levels of operating conditions at least partially based on the at least one environmental condition (value) measured by the sensor $S_{ENVIRON}$. Typical environmental conditions monitored by the sensor $S_{ENVIRON}$ may include wind speed, air density, irradiance, atmospheric turbulence, rain conditions, snow conditions, air temperature, and humidity. Accordingly, the sensor $S_{ENVIRON}$ may include an anemometer, an air densimeter, a hygrometer, a thermometer, a rain sensor, a snow sensor, a turbulence sensor, or the like.

Since the power output of the intermittent power plant 200 strongly depends on the environment, in particular atmospheric conditions, the accuracy of control by the controller 1220 may be improved by taking into account environmental conditions determining the power output of intermittent power supply 200. For example, the controller 1220 may curtail the power output of an intermittent solar power plant 200 if a pyranometer sensor $S_{ENVIRON}$ measures an increase in solar radiation at the location 221 of the supply 200 and the energy management system 1000 sends a message advising of a reduction in electricity consumption. Thus, the total balance of active power in the grid G may be maintained within desired limits.

Figure 3:
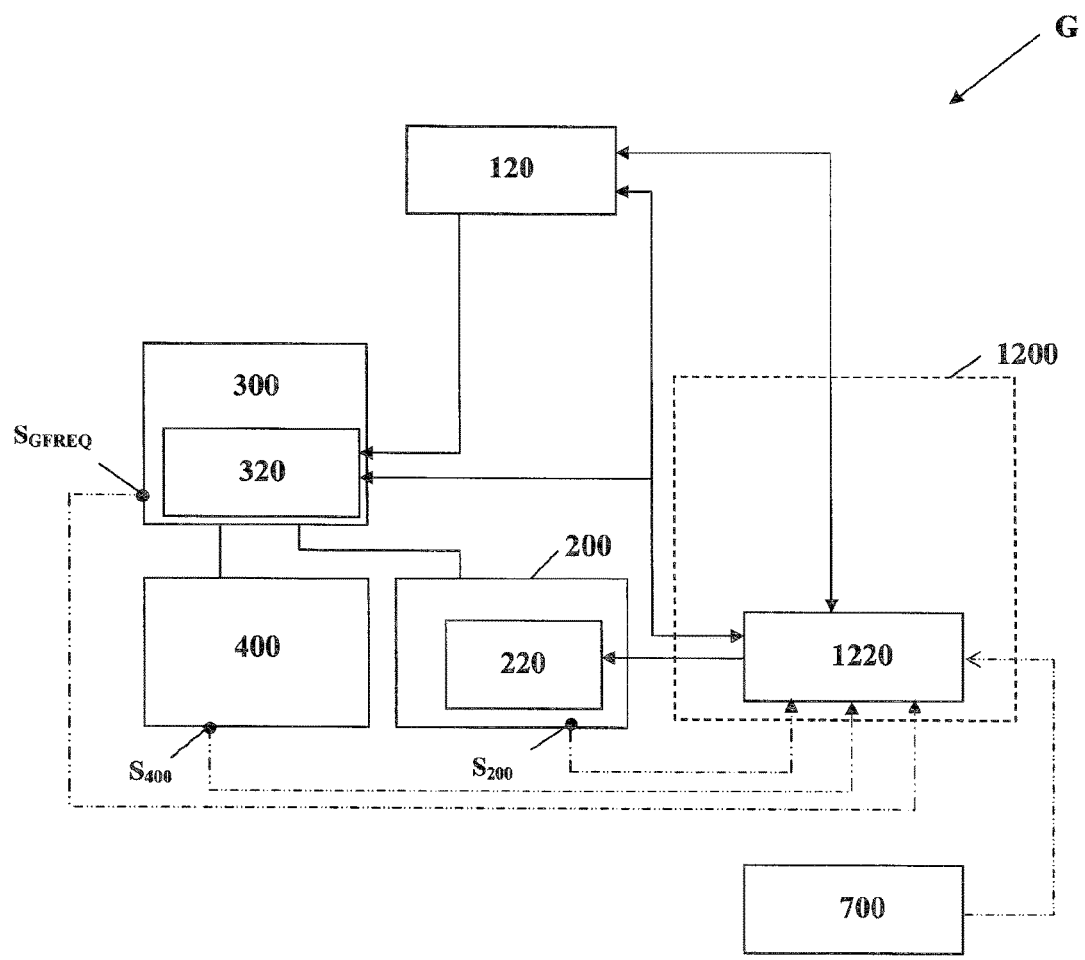
FIG. 3 is a block diagram illustrating a utility grid in accordance with another embodiment of the invention.

FIG. 3 is a block diagram illustrating a utility grid G in accordance with another embodiment of the invention. The basic configuration of the utility grid G in FIG. 3 is similar to the grid G shown in FIG. 1. However, in FIG. 3, the energy variability controller 1220 is communicative with at least one forecasting generator 700 for providing at least one forecasting variable. For example, a forecast environmental value may be monitored by the forecasting generator 700. The controller 1220 is configured to control levels of operating conditions at least partially based on the at least one forecasting variable (value) provided by the forecasting generator 700. Typical forecasting variables predicted by the forecasting generator 700 include a weather forecast, a storm warning, wind speed, air density, irradiance, atmospheric turbulence, rain conditions, snow conditions, air temperature, and humidity. Accordingly, the forecasting generator 700 may include a meteorological service or reporting system.

Thus, the controller 1220 may anticipate future weather conditions at the site or location 221 of the intermittent power supply 200 within a selected forecast horizon. In particular, the controller 1220 may determine a plurality of meteorological scenarios weighted with different probabilities. Since the power output of the intermittent power supply 200 strongly depends on weather conditions at the plant site 221, the accuracy of control by the controller 1220 may be improved by taking into account future weather conditions governing the future power output of the intermittent power supply 200. For example, the forecasting generator 700 may report a cloudless sunny morning. As a result, the energy variability controller 1220 may have to curtail intermittent solar power plant 200 output to match the expected power demand.

Figure 4:
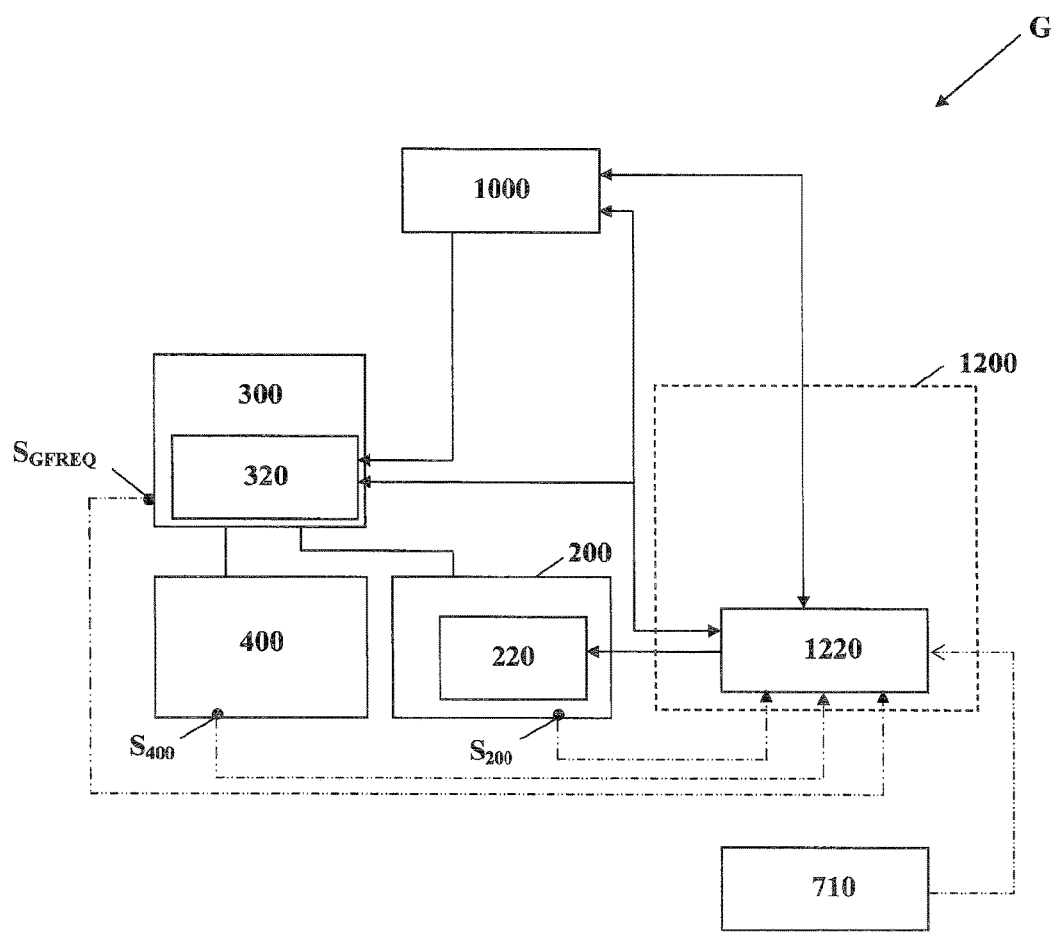
FIG. 4 is a block diagram illustrating a utility grid in accordance with another embodiment of the invention.

FIG. 4 is a block diagram illustrating a utility grid G in accordance with another embodiment of the invention. In FIG. 4, the controller 1220 is communicative with at least one economic efficiency generator 710. The economic efficiency generator 710 provides at least one economic efficiency variable, which is typically selected from the group consisting of a cost of operation, a fuel price, a market price of electrical energy, and a power transmission fee. The controller 1220 is configured to control levels of operating conditions at least partially based on the economic efficiency variable (value) provided by the economic efficiency generator 710. Thus, the controller 1220 may control the intermittent power supply 200 on the basis of economic factors as well as other conditions.

For example, energy variability may be optimized based on the balance of power grid operating costs versus electricity sales revenues. On one hand, reduced variability means reduced power output from the intermittent power supply 200. On the other hand, increased variability may lead to excessive wear on grid equipment (such as distribution transformers and capacitors) and suboptimal modes of operation for conventional power sources (such as coal power plants). By optimizing energy variability, the controller 1220 allows for economic optimization of power grid operations.

Figure 5:
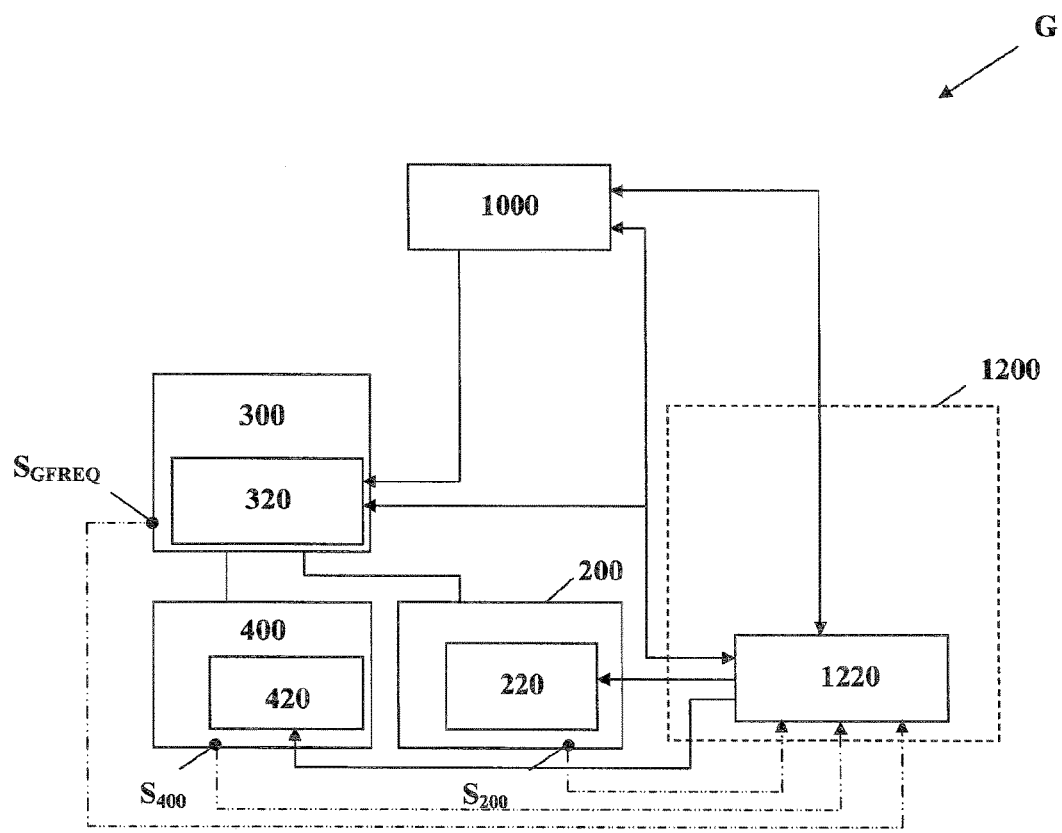
FIG. 5 is a block diagram illustrating a utility grid in accordance with another embodiment of the invention.

FIG. 5 is a block diagram illustrating a utility grid G in accordance with another embodiment of the invention. The basic configuration of the utility grid G in FIG. 5 is similar to the grid G shown in FIG. 1. However, the electricity consumption device 400 in FIG. 5 is equipped with at least one demand control device 420.

Figure 6:
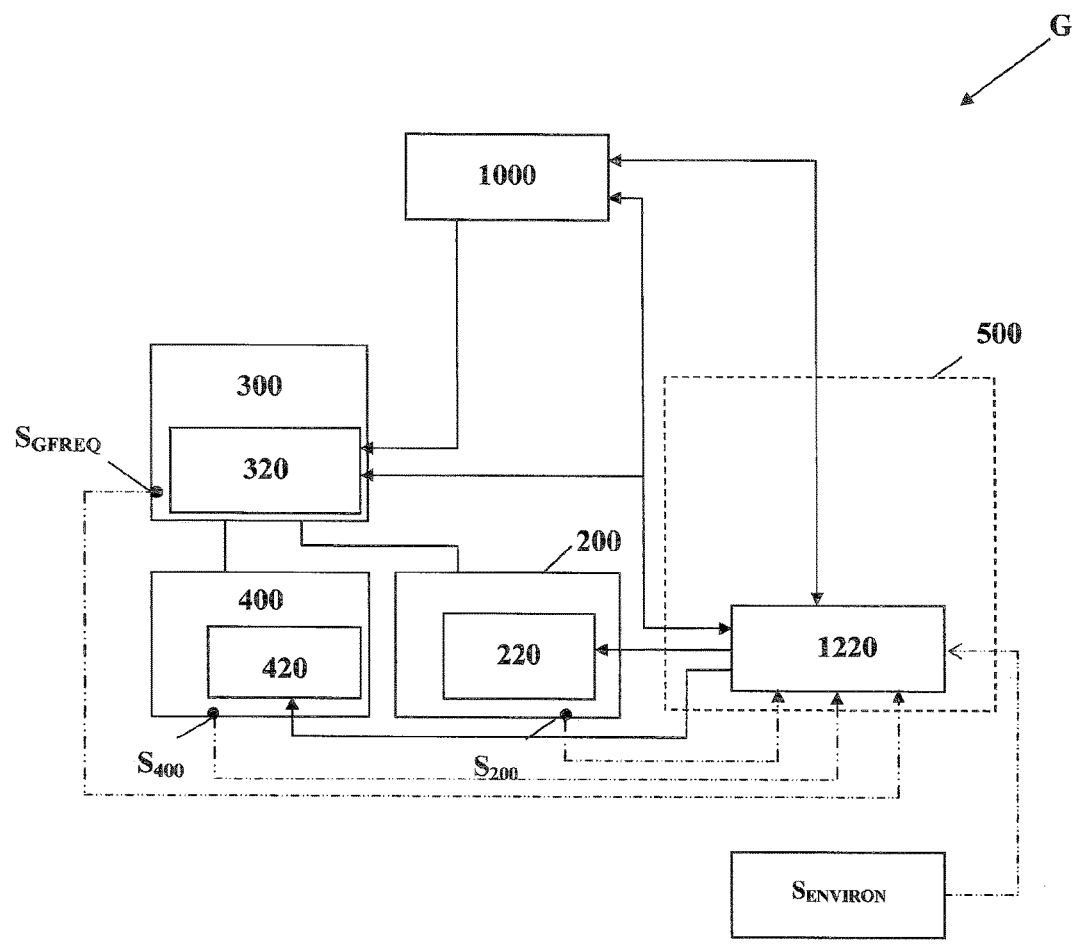
FIG. 6 is a block diagram illustrating a utility grid in accordance with another embodiment of the invention.

FIG. 6 is a block diagram illustrating a utility grid G in accordance with another embodiment of the invention. The basic configuration of the utility grid G in FIG. 6 is similar to the grid G shown in FIG. 2. However, the electricity consumption device 400 in FIG. 6 is equipped with at least one demand control device 420.

Figure 7:
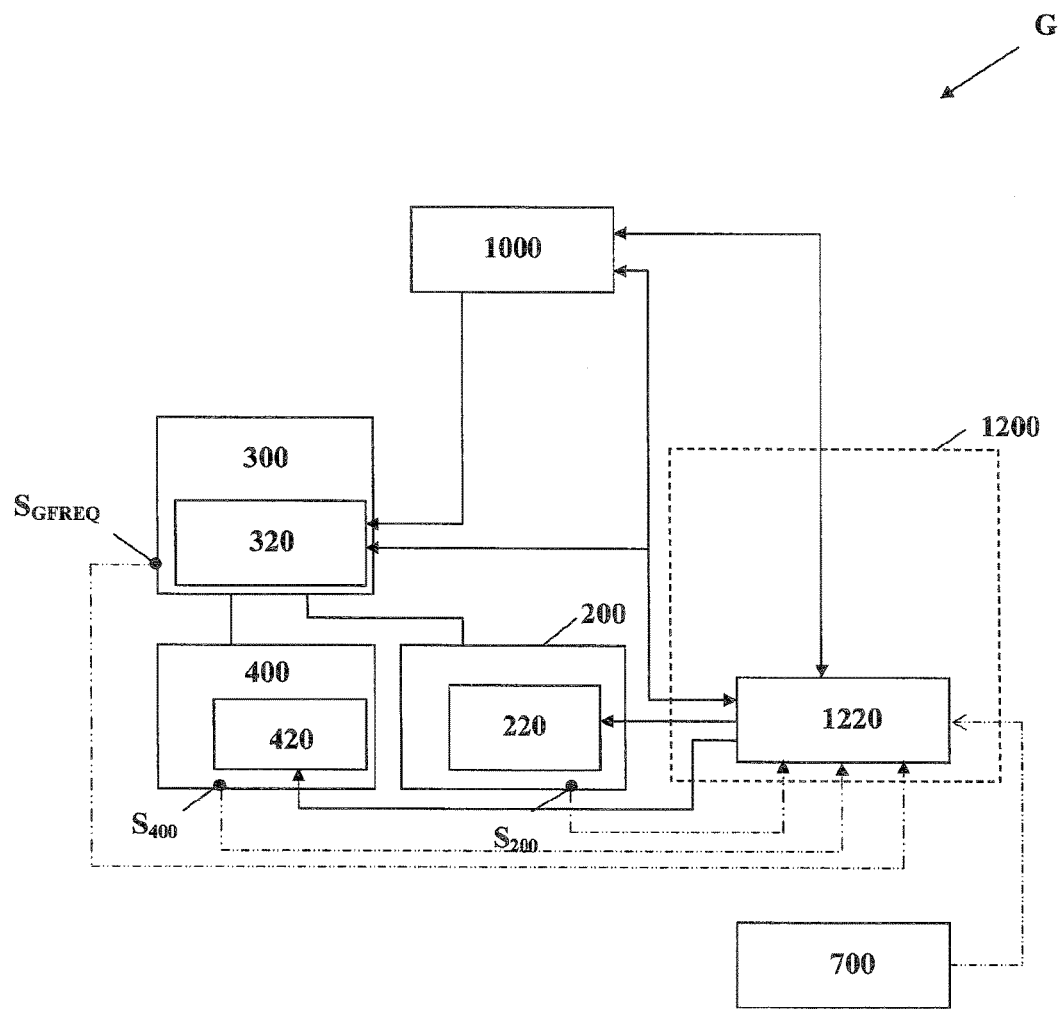
FIG. 7 is a block diagram illustrating a utility grid in accordance with another embodiment of the invention.

FIG. 7 is a block diagram illustrating a utility grid G in accordance with another embodiment of the invention. The basic configuration of the utility grid G in FIG. 7 is similar to the grid G shown in FIG. 3. However, the electricity consumption device 400 in FIG. 7 is equipped with at least one demand control device 420.

Figure 8:
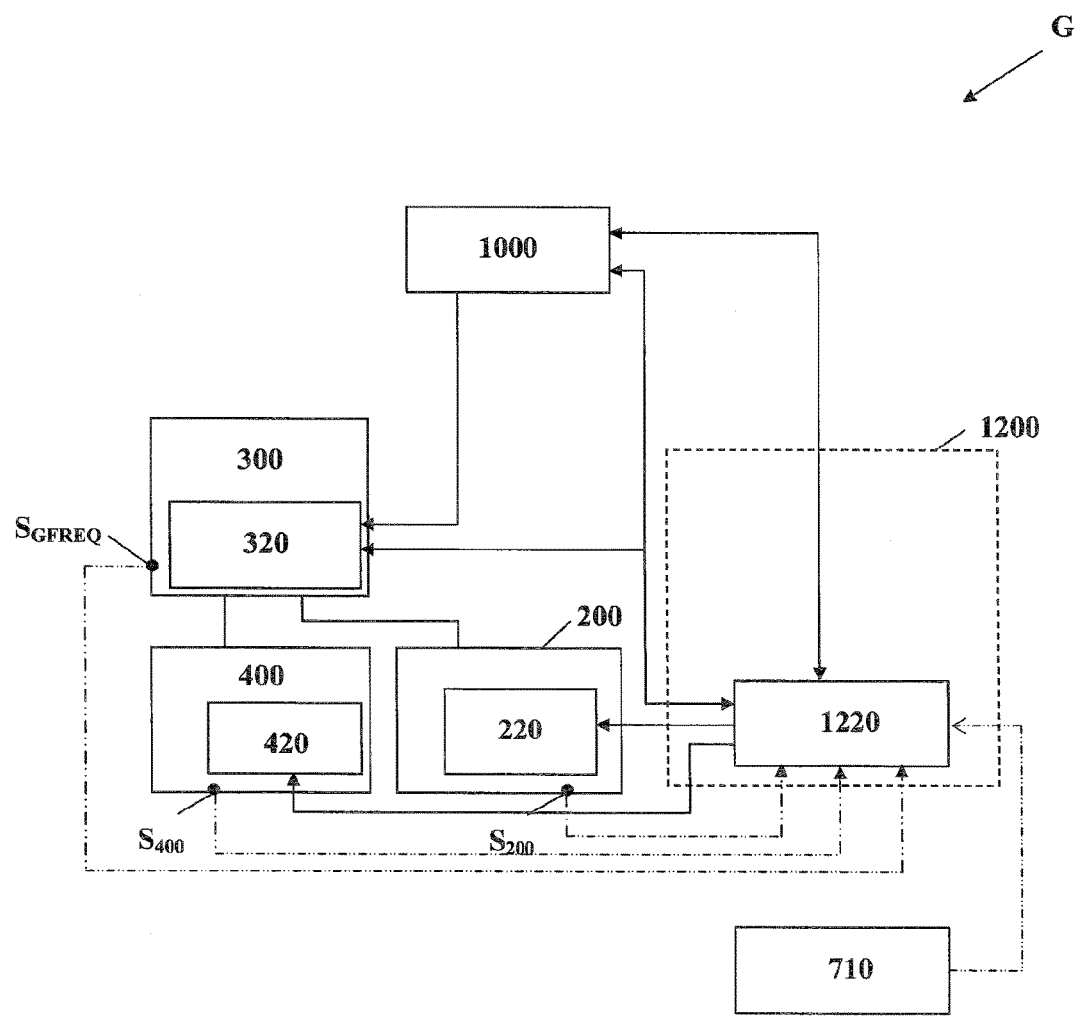
FIG. 8 is a block diagram illustrating a utility grid in accordance with another embodiment of the invention.

FIG. 8 is a block diagram illustrating a utility grid G in accordance with another embodiment of the invention. The basic configuration of the utility grid G in FIG. 8 is similar to the grid G shown in FIG. 4. However, the electricity consumption device 400 in FIG. 8 is equipped with at least one demand control device 420.

Figure 9:
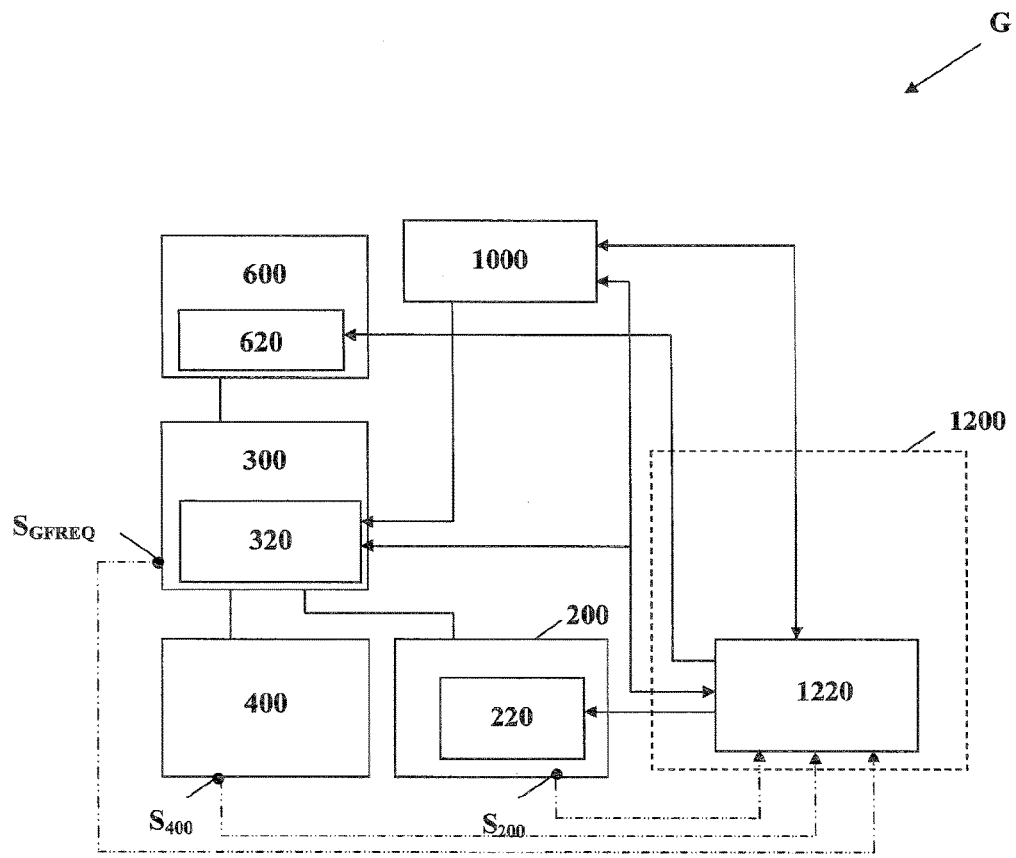
FIG. 9 is a block diagram illustrating a utility grid in accordance with another embodiment of the invention.

FIG. 9 is a block diagram illustrating a utility grid G in accordance with another embodiment of the invention. The basic configuration of the utility grid G in FIG. 9 is similar to the grid G shown in FIG. 1. However, the utility grid G in FIG. 9 further includes an energy storage device 600 with at least one storage control device 620.

Figure 10:
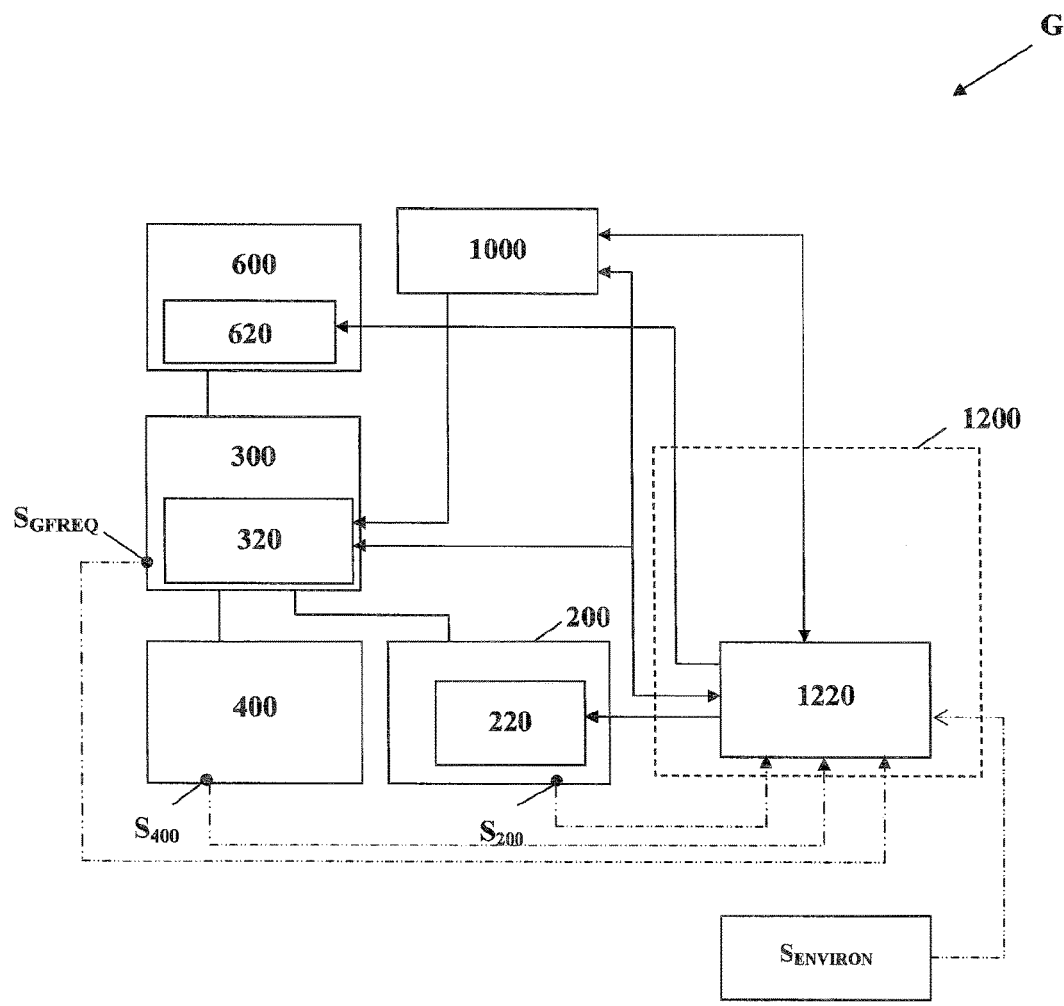
FIG. 10 is a block diagram illustrating a utility grid in accordance with another embodiment of the invention.

FIG. 10 is a block diagram illustrating a utility grid G in accordance with another embodiment of the invention. The basic configuration of the utility grid G in FIG. 10 is similar to the grid G shown in FIG. 2. However, the utility grid G in FIG. 10 further includes an energy storage device 600 with at least one storage control device 620.

Figure 11:
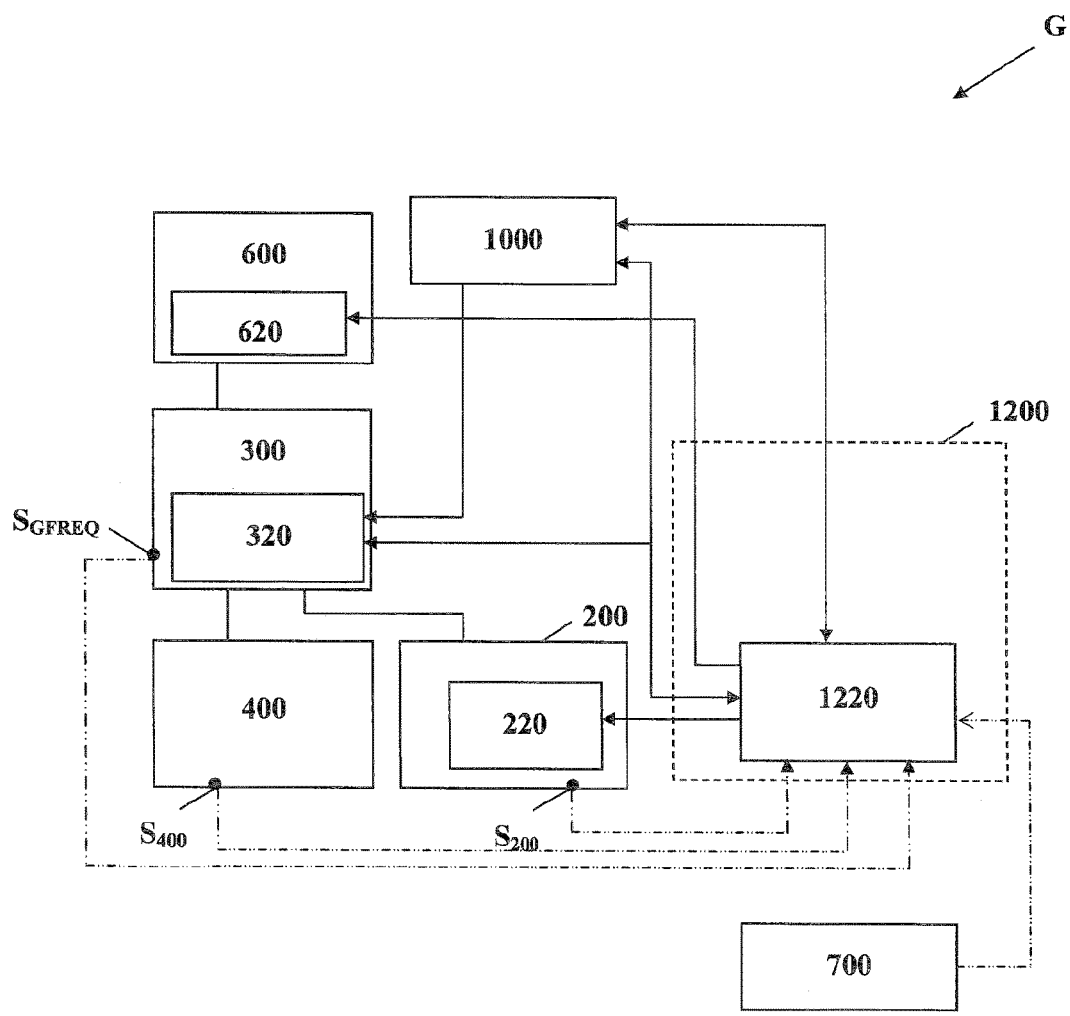
FIG. 11 is a block diagram illustrating a utility grid in accordance with another embodiment of the invention.

FIG. 11 is a block diagram illustrating a utility grid G in accordance with another embodiment of the invention. The basic configuration of the utility grid G in FIG. 11 is similar to the grid G shown in FIG. 3. However, the utility grid G in FIG. 11 further includes an energy storage device 600 with at least one storage control device 620.

Figure 12:
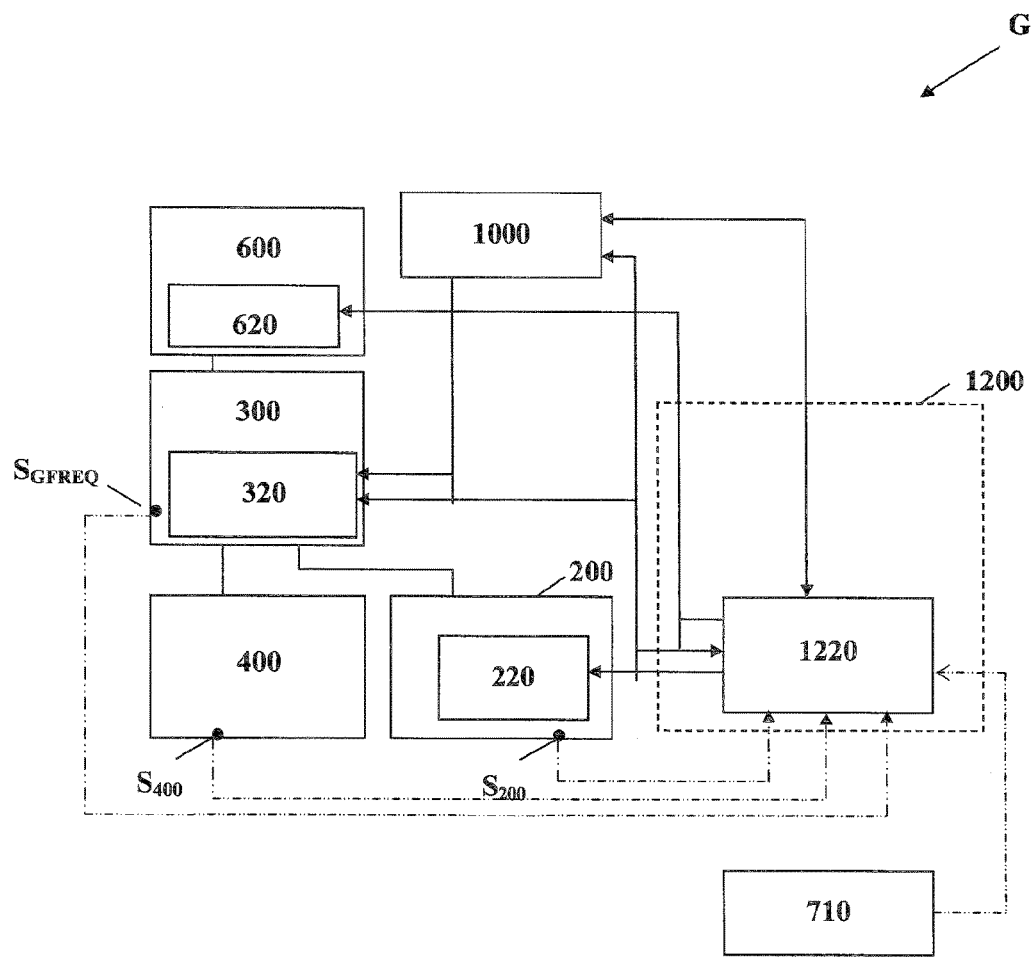
FIG. 12 is a block diagram illustrating a utility grid in accordance with another embodiment of the invention.

FIG. 12 is a block diagram illustrating a utility grid G in accordance with another embodiment of the invention. The basic configuration of the utility grid G in FIG. 12 is similar to the grid G shown in FIG. 4. However, the utility grid G in FIG. 12 further includes an energy storage device 600 with at least one storage control device 620.

Figure 13:
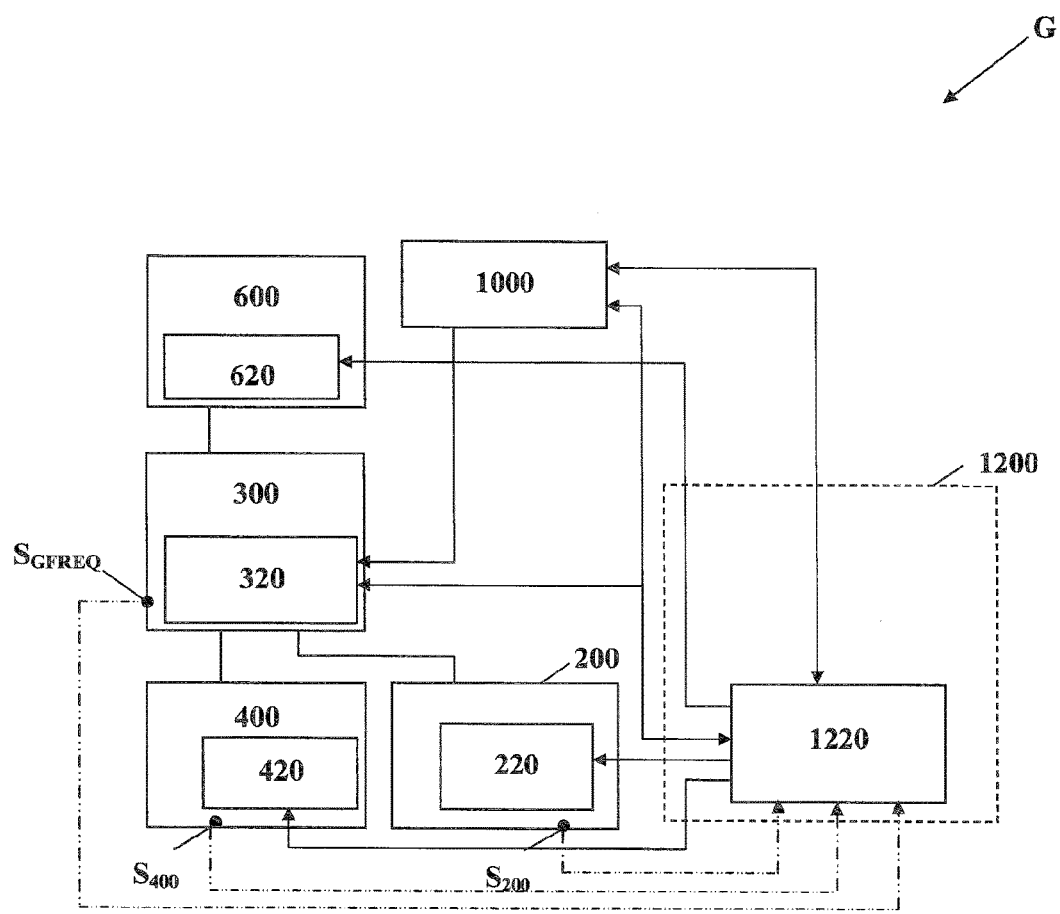
FIG. 13 is a block diagram illustrating a utility grid in accordance with another embodiment of the invention.

FIG. 13 is a block diagram illustrating a utility grid G in accordance with another embodiment of the invention. The basic configuration of the utility grid G in FIG. 13 is similar to the grid G shown in FIG. 5. However, the utility grid G in FIG. 13 further includes an energy storage device 600 with at least one storage control device 620.

Figure 14:
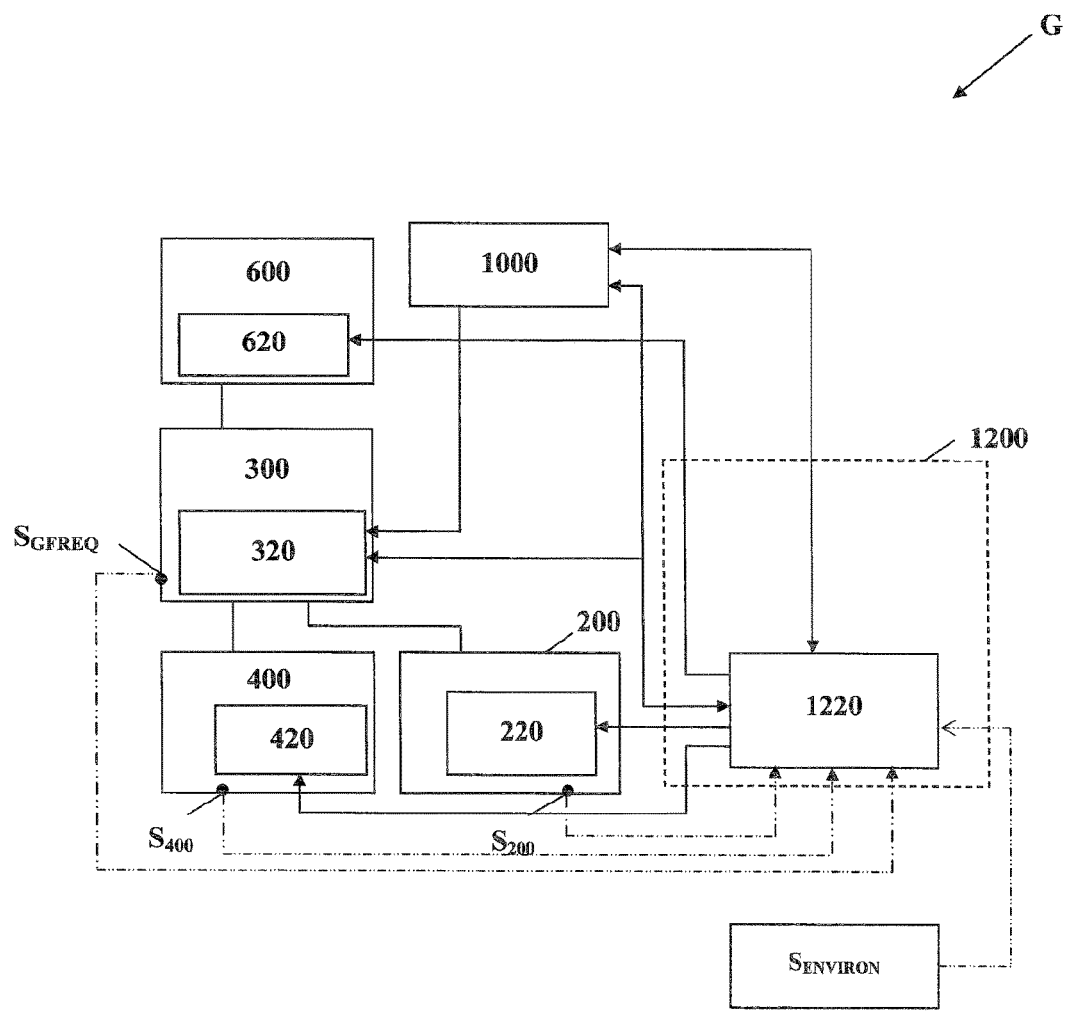
FIG. 14 is a block diagram illustrating a utility grid in accordance with another embodiment of the invention.

FIG. 14 is a block diagram illustrating a utility grid G in accordance with another embodiment of the invention. The basic configuration of the utility grid G in FIG. 14 is similar to the grid G shown in FIG. 6. However, the utility grid G in FIG. 14 further includes an energy storage device 600 with at least one storage control device 620.

Figure 15:
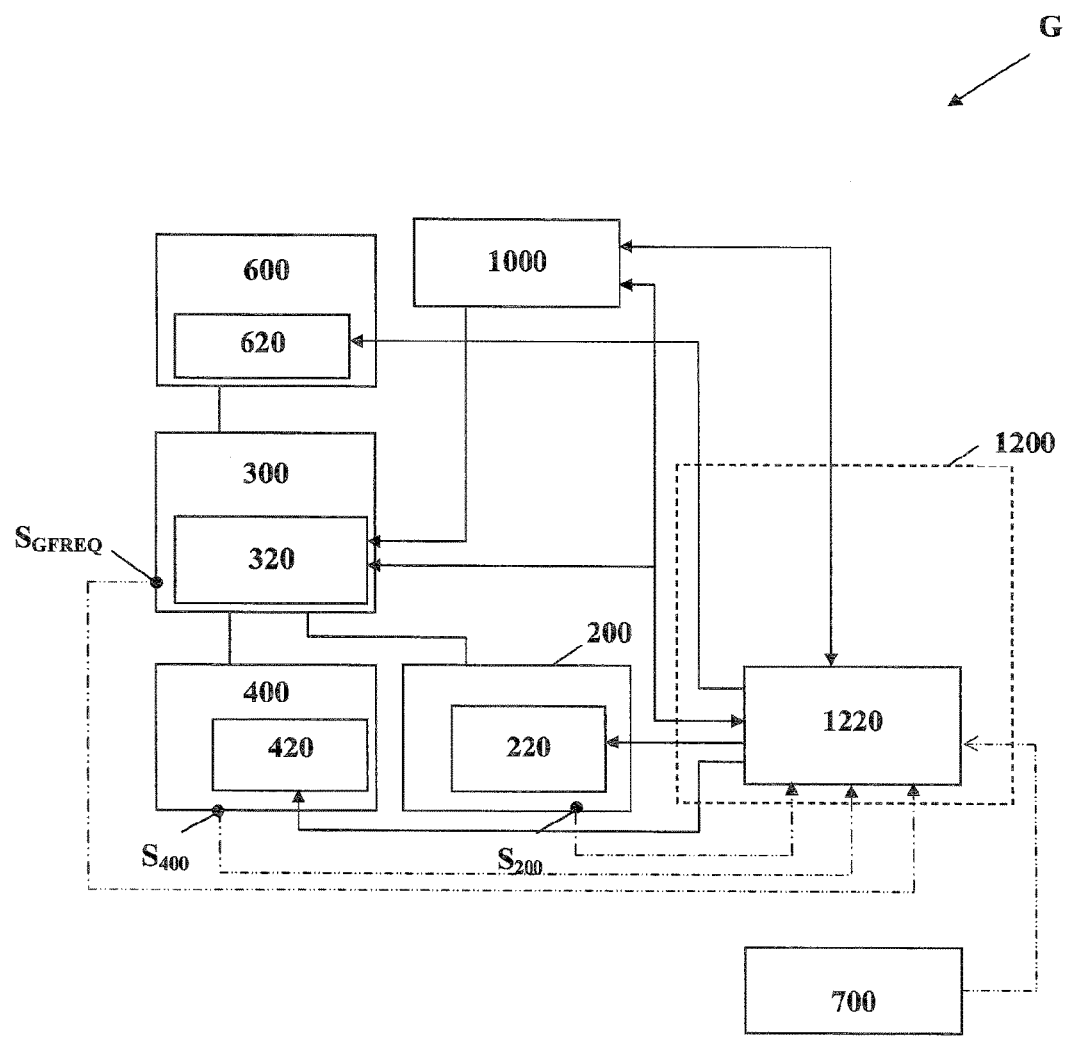
FIG. 15 is a block diagram illustrating a utility grid in accordance with another embodiment of the invention.

FIG. 15 is a block diagram illustrating a utility grid G in accordance with another embodiment of the invention. The basic configuration of the utility grid G in FIG. 15 is similar to the grid G shown in FIG. 7. However, the utility grid G in FIG. 15 further includes an energy storage device 600 with at least one storage control device 620.

Figure 16:
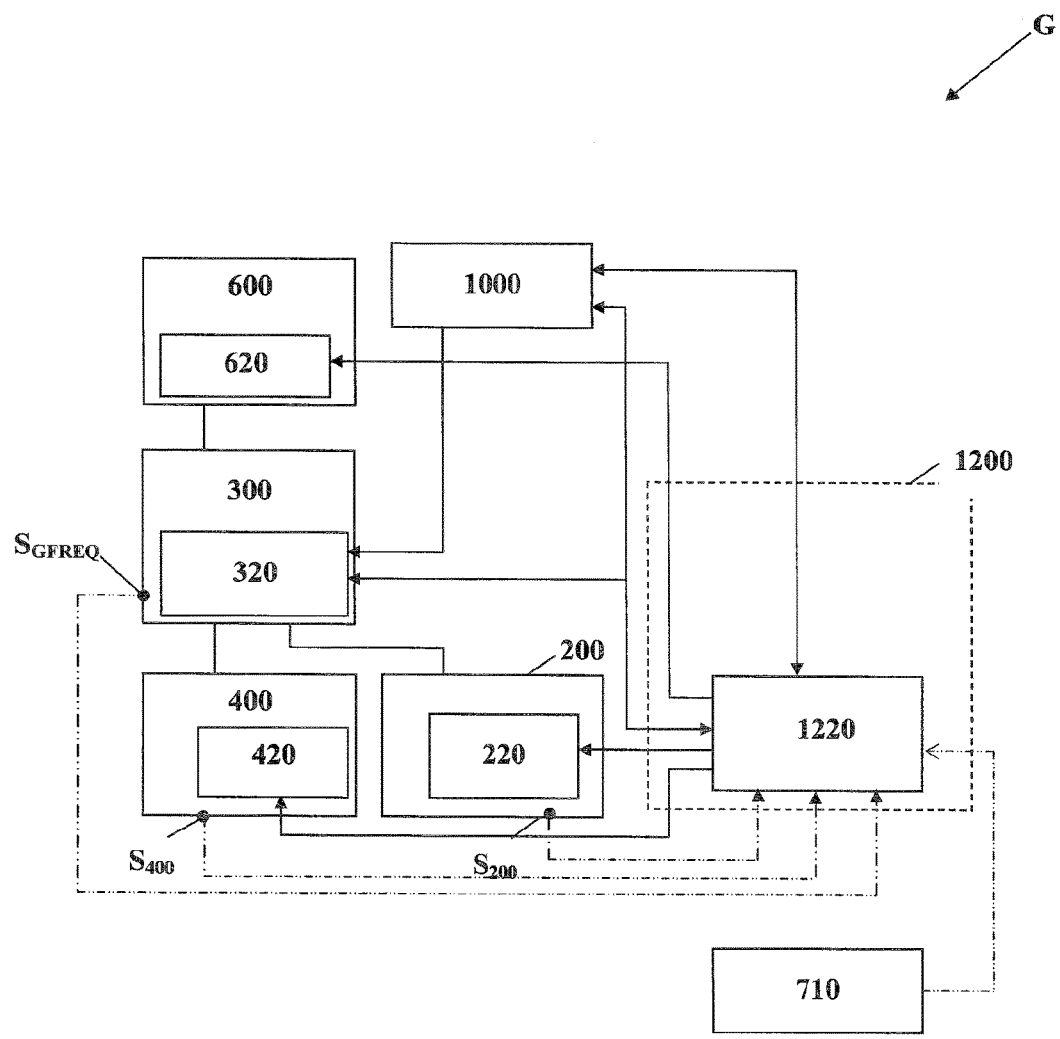
FIG. 16 is a block diagram illustrating a utility grid in accordance with another embodiment of the invention.

FIG. 16 is a block diagram illustrating a utility grid G in accordance with another embodiment of the invention. The basic configuration of the utility grid G in FIG. 16 is similar to the grid G shown in FIG. 8. However, the utility grid G in FIG. 16 further includes an energy storage device 600 with at least one storage control device 620.

Figure 17:
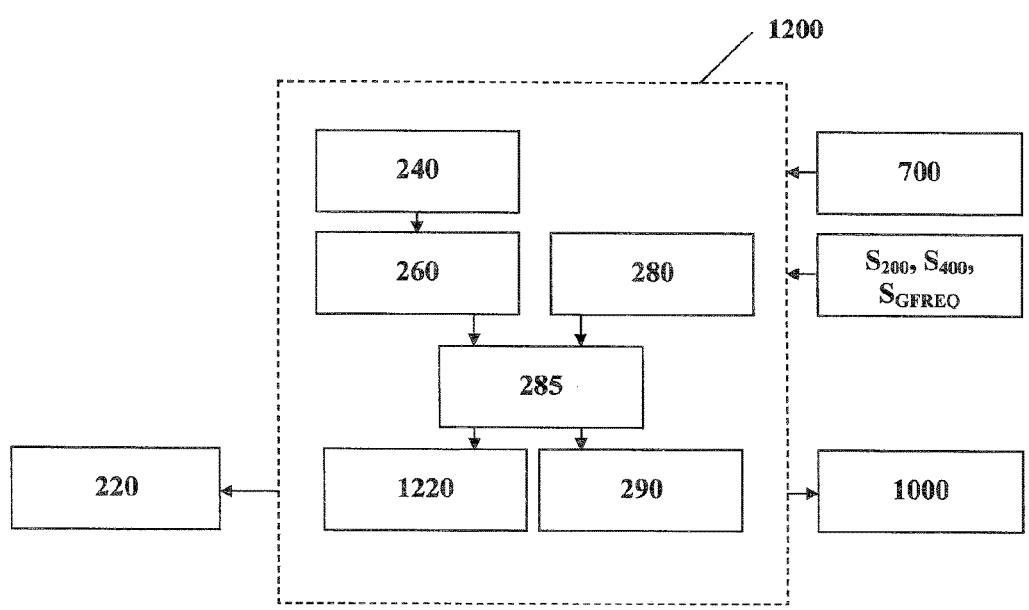
FIG. 17 is a block diagram illustrating an intermittent energy management system in accordance with an embodiment of the invention.

FIG. 17 is a block diagram illustrating an intermittent energy management system 1200 in accordance with an embodiment of the invention. In FIG. 17, the intermittent energy management system 1200 includes an intermittent energy resource forecasting generator 240. The intermittent energy resource forecasting generator 240 receives input from various sensors $S_{200}$, $S_{GFREQ}$, $S_{400}$ and/or from the forecasting generator 700. The intermittent energy resource forecasting generator 240 is configured to provide a forecast of the intermittent energy resources used within a forecasting horizon based on the information received. The intermittent energy management system 1200 may further include an intermittent power generation forecasting generator 260 configured to estimate the operating conditions of the intermittent power supply 200 within the selected forecasting horizon. For example, the intermittent power generation forecasting generator 260 may determine the power output of the intermittent power supply 200 based on an intermittent energy resource forecast. Furthermore, the intermittent power generation forecasting generator 260 may determine from the estimated power output whether the desired levels of operating conditions requested by the energy management system 1000 may be produced by the intermittent power supply 200 within the forecast horizon.

The intermittent energy management system 1200 may also include a power demand forecasting generator 280 configured to estimate the total power demand of the electricity consumption device 400. For example, the power demand forecasting generator 280 may determine the power demand of the electricity consumption device 400 based on a weather forecast.

The intermittent energy management system 1200 may also include a power flow forecasting generator 285 configured to assess expected operating conditions including but not limited to voltage, frequency, and power factor in the utility grid G within a selected forecasting horizon and to communicate these conditions to the energy variability controller 1220.

The intermittent energy management system 1200 may also include a reporting generator 290 configured to report to the energy management system 1000 whether the desired levels of operating conditions of the intermittent power supply 200 can be produced within the forecasting horizon and whether the operating conditions in the grid G can be maintained within a desired range. The reporting generator 290 may also be configured to report the estimated levels of operating conditions of the intermittent power supply 200 as determined by the intermittent power generation forecasting generator 280 to the energy management system 1000.

Thus, the energy management system 1000 is informed by the intermittent energy management system 1200 of the prospective levels of operating conditions of the intermittent power supply 200 and the operating conditions in the grid G, and may schedule appropriate measures if necessary. For example, power generation may be increased in another part of grid G if the intermittent power supply 200 does not have sufficient resources to maintain the desired levels of operating conditions and therefore the desired operating conditions in the grid G. Thus, the accuracy of control by the intermittent energy management system 1200 may be improved by taking into account weather forecasts or other forecasts governing the future power output of the intermittent power supply 200. Furthermore, the power demand of the electricity consumption device 400 may be taken into account by the power demand forecasting generator 280 within a selected forecasting horizon.

Figure 18:
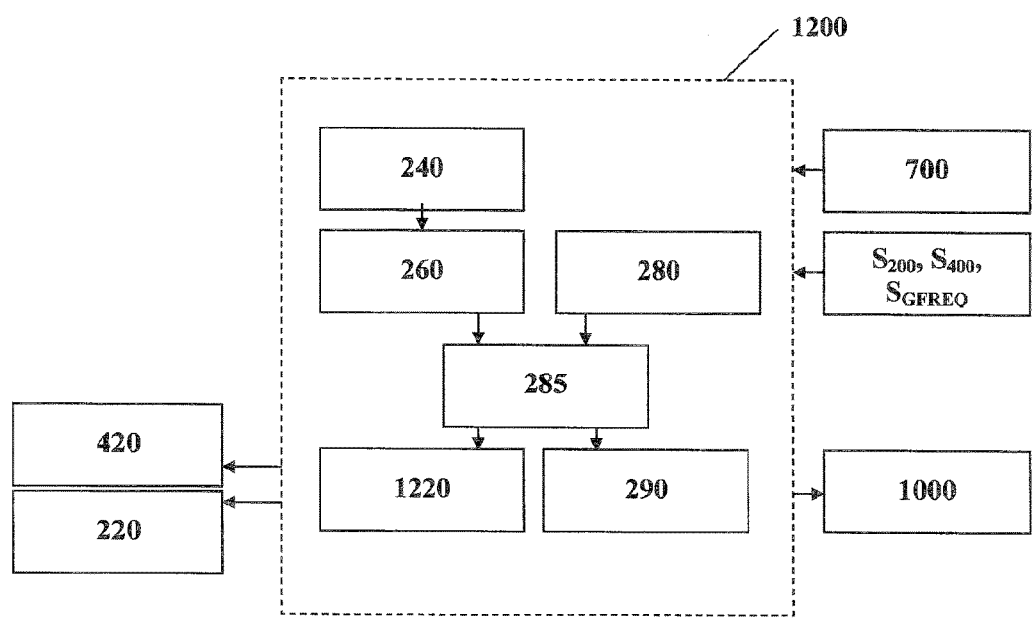
FIG. 18 is a block diagram illustrating an intermittent energy management system in accordance with another embodiment of the invention.

FIG. 18 is a block diagram illustrating an intermittent energy management system 1200 in accordance with another embodiment of the invention. The basic configuration of the intermittent energy management system 1200 in FIG. 18 is similar to that shown in FIG. 17. However, in FIG. 18, the utility grid G includes an electricity consumption device 400 equipped with at least one demand control device 420 communicative with the energy variability controller 1220.

Figure 19:
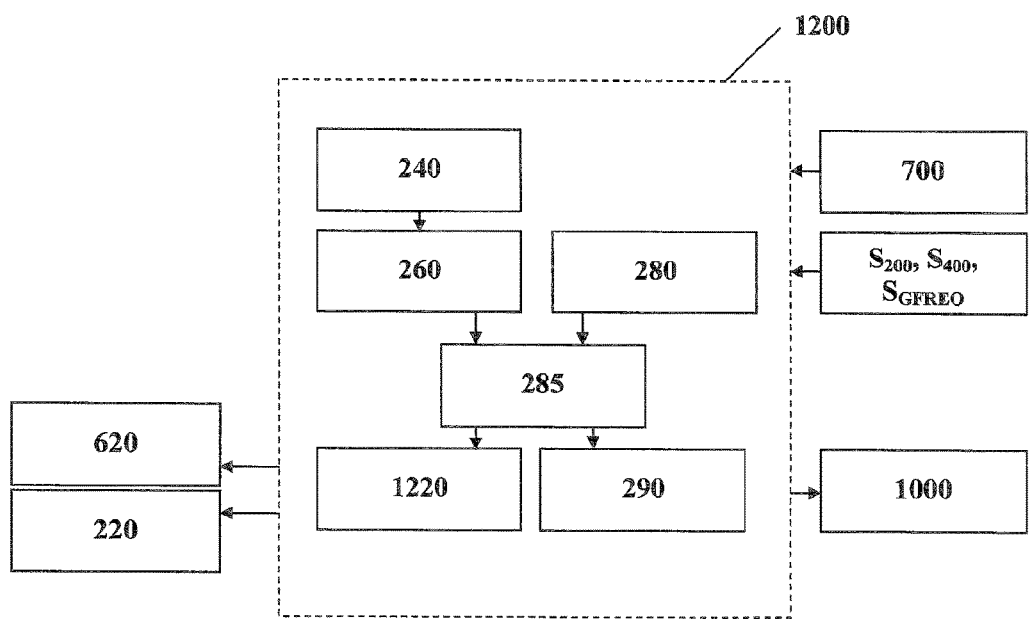
FIG. 19 is a block diagram illustrating an intermittent energy management system in accordance with another embodiment of the invention.

FIG. 19 is a block diagram illustrating an intermittent energy management system 1200 in accordance with another embodiment of the invention. The basic configuration of the intermittent energy management system 1200 in FIG. 19 is similar to that shown in FIG. 17. However, in FIG. 19, the utility grid G includes an energy storage device 600 equipped with an at least one storage control device 620 communicative with the energy variability controller 1220.

Figure 20:
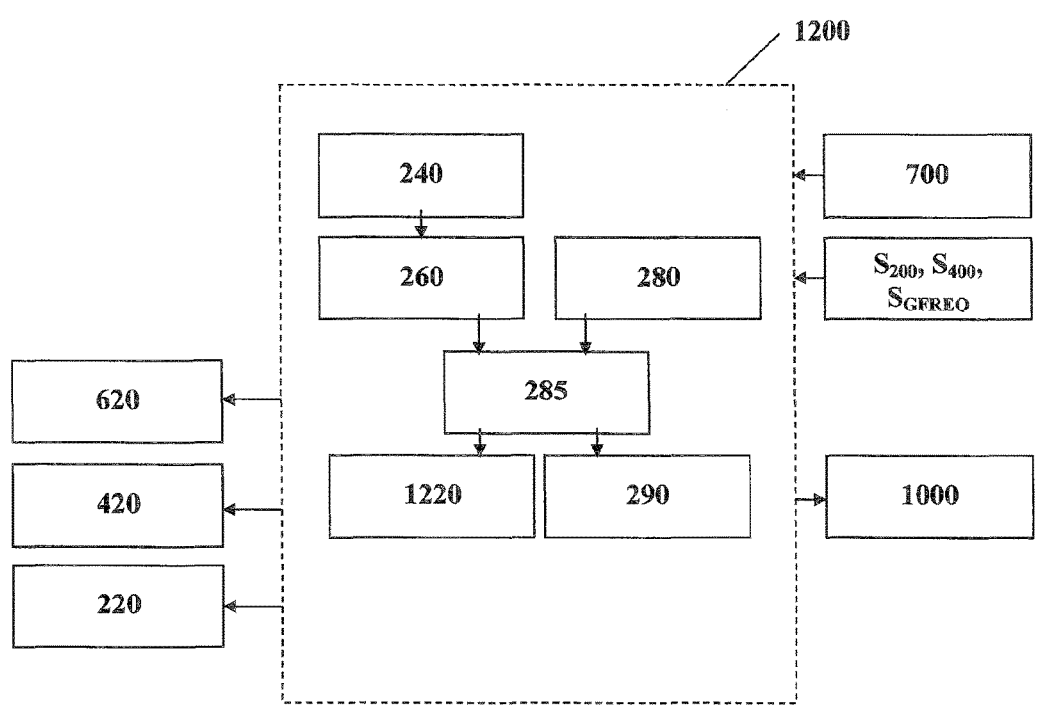
FIG. 20 is a block diagram illustrating an intermittent energy management system in accordance with another embodiment of the invention.

FIG. 20 is a block diagram illustrating an intermittent energy management system 1200 in accordance with another embodiment of the invention. The basic configuration of the intermittent energy management system 1200 in FIG. 20 is similar to that shown in FIG. 17. However, in FIG. 20, the utility grid G includes an electricity consumption device 400 equipped with at least one demand control device 420 and an energy storage device 600 equipped with at least one storage control device 620. The demand control device 600 and the storage control device 620 are communicative with the energy variability controller 1220.

Referring to FIGS. 18-20, according to one embodiment, the intermittent energy resource forecasting generator 240, the intermittent power generation forecasting generator 260, the power demand forecasting generator 280, the power flow forecasting generator 285, the reporting generator 290, and the energy variability controller 1220 may be implemented by a respective software module 3310 within the intermittent energy management system 1200. According to another embodiment, the intermittent energy resource forecasting generator 240, the intermittent power generation forecasting generator 260, the power demand forecasting generator 280, the power flow forecasting generator 285, the reporting generator 290, and the energy variability controller 1220 may be implemented by a respective hardware module 3210 within or coupled to the intermittent energy management system 1200.

Aspects of the above described method may be summarized with the aid of a flowchart.

Figure 26:
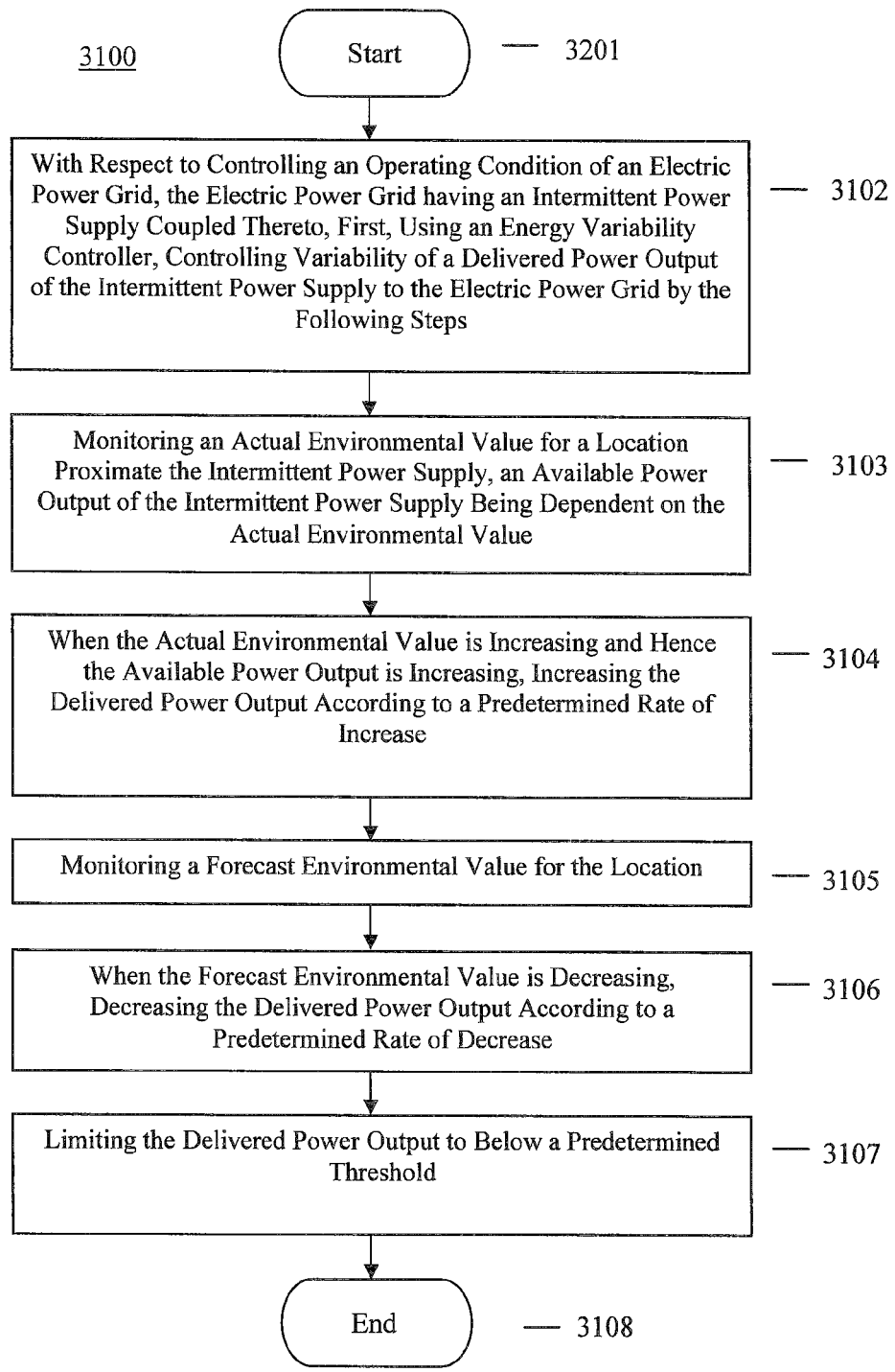

FIG. 26 is a flow chart illustrating operations 3100 of modules (e.g., 3310) within a data processing system (e.g., 1200, 1220, 3000) for controlling an operating condition of an electric power grid (or utility grid G), the electric power grid G having an intermittent power supply 200 coupled (i.e., electrically coupled) thereto, in accordance with an embodiment of the invention.

At step 3101, the operations 3100 start.

At step 3102, using an energy variability controller 1220, variability R of a delivered power output 2710 of the intermittent power supply 200 to the electric power grid G is controlled by the following steps.

At step 3103, an actual environmental value for a location 221 proximate the intermittent power supply 200 is monitored, an available power output 2720 of the intermittent power supply 200 being dependent on the actual environmental value.

At step 3104, when the actual environmental value is increasing and hence the available power output 2720 is increasing, the delivered power output 2710 is increased according to a predetermined rate of increase 2730.

At step 3105, a forecast environmental value for the location 221 is monitored.

At step 3106, when the forecast environmental value is decreasing, the delivered power output 2710 is decreased according to a predetermined rate of decrease.

At step 3107, the delivered power output 2710 is limited to below a predetermined threshold R1.

At step 3108, the operations 3100 end.

In the above method, the operating condition may be frequency or frequency variability. The operating condition may be voltage or voltage variability. The intermittent power supply 200 may include a wind turbine, wherein the actual environmental value is an actual wind speed, and wherein the forecast environmental value is a forecast wind speed. The intermittent power supply 200 may include a photovoltaic array, wherein the actual environmental value is an actual solar irradiance, and wherein the forecast environmental value is a forecast solar irradiance. The intermittent power supply 200 may be one or more intermittent power supplies 200. The operating condition may be one or more operating conditions.

Also in the above method, the electric power grid G may have coupled thereto a continuous power supply 300. The method may further include controlling a delivered power output of the continuous power supply 300 to further control the operating condition of the electric power grid G. The delivered power output of the continuous power supply 300 may be a delivered reactive power output. The method may further include generating a forecast of an available power output of the continuous power supply 300. The controlling of the delivered power output of the continuous power supply 300 may be based on the forecast. The continuous power supply may be one or more continuous power supplies 300. The continuous power supply 300 may be a thermal power supply 300. The continuous power supply 300 may be a hydro-electric power supply 300.

Also in the above method, the electric power grid G may have coupled thereto a controllable load (or power consumption device) 400. The method may further include controlling a power consumption of the controllable load 400 to further control the operating condition of the electric power grid G. The power consumption of the controllable load 400 may be a reactive power consumption. The controllable load 400 may be one or more controllable loads 400.

Also in the above method, the electric power grid G may have coupled thereto an energy storage device 600. The method may further include controlling a delivered power output of the energy storage device 600 to further control the operating condition of the electric power grid G. The energy storage device 600 may be one or more energy storage devices 600.

Also in the above method, the actual environmental value may be monitored by a sensor $S_{ENVIRON}$. The sensor may be located at the location 221 proximate the intermittent power supply 200.

Finally, in the above method, the electric power grid G may be a utility grid G.

According to one embodiment, each of the above steps 3101-3108 may be implemented by a respective software module 3310. According to another embodiment, each of the above steps 3101-3108 may be implemented by a respective hardware module 3210. According to another embodiment, each of the above steps 3101-3108 may be implemented by a combination of software 3310 and hardware modules 3210. For example, FIG. 26 may represent a block diagram illustrating the interconnection of specific hardware modules 3101-3108 (collectively 3210) within the data processing system 3000, each hardware module 3101-3108 adapted or configured to implement a respective step of the method of the invention. As such, the present invention advantageously improves the operation of the data processing system 3000.

While aspect of this invention are primarily discussed as a method, a person of ordinary skill in the art will understand that the apparatus discussed above with reference to a data processing system 3000 may be programmed to enable the practice of the method of the invention. Moreover, an article of manufacture for use with a data processing system 3000, such as a pre-recorded storage device or other similar computer readable medium or computer program product including program instructions recorded thereon, may direct the data processing system 3000 to facilitate the practice of the method of the invention. It is understood that such apparatus, products, and articles of manufacture also come within the scope of the invention.

In particular, the sequences of instructions which when executed cause the method described herein to be performed by the data processing system 3000 may be contained in a data carrier product according to one embodiment of the invention. This data carrier product may be loaded into and run by the data processing system 3000. In addition, the sequences of instructions which when executed cause the method described herein to be performed by the data processing system 3000 may be contained in a computer software product or computer program product (e.g., comprising a non-transitory medium) according to one embodiment of the invention. This computer software product or computer program product may be loaded into and run by the data processing system 3000. Moreover, the sequences of instructions which when executed cause the method described herein to be performed by the data processing system 3000 may be contained in an integrated circuit product (e.g., a hardware module or modules 3210) which may include a coprocessor or memory according to one embodiment of the invention. This integrated circuit product may be installed in the data processing system 3000.

The above embodiments may contribute to an improved utility grid G, intermittent energy management system 1200, and method for managing operating conditions in a utility grid G and may provide one or more advantages. For example, the application of one or more energy variability controllers 1220 facilitates control of the utility grid G and management of its operating conditions. In particular, operations of conventional power control devices 320 like power substation transformers may be reduced thus improving the reliability of their performance and increasing their longevity.

The embodiments of the invention described above are intended to be exemplary only. Those skilled in the art will understand that various modifications of detail may be made to these embodiments, all of which come within the scope of the invention.

What is claimed is:

1. A method for controlling an operating condition of an electric power grid, the electric power grid having an intermittent power supply coupled thereto, the method comprising:

using an energy variability controller, controlling variability of a delivered power output of the intermittent power supply to the electric power grid by:

monitoring an actual environmental value for a location proximate the intermittent power supply, an available power output of the intermittent power supply being dependent on the actual environmental value;

when the actual environmental value is increasing and hence the available power output is increasing, increasing the delivered power output according to a predetermined rate of increase;

monitoring a forecast environmental value for the location;

when the forecast environmental value is decreasing, decreasing the delivered power output according to a predetermined rate of decrease;

limiting the delivered power output to below a predetermined threshold; and, selectively adjusting at least one of the predetermined rate of increase, the predetermined rate of decrease, and the predetermined threshold based on a difference between feedback measured variability signals and target variability signals.

2. The method of claim 1, wherein the operating condition is frequency or frequency variability.

3. The method of claim 1, wherein the operating condition is voltage or voltage variability.

4. The method of claim 1, wherein the intermittent power supply includes a wind turbine, wherein the actual environmental value is an actual wind speed, and wherein the forecast environmental value is a forecast wind speed.

5. The method of claim 1, wherein the intermittent power supply includes a photovoltaic array, wherein the actual environmental value is an actual solar irradiance, and wherein the forecast environmental value is a forecast solar irradiance.

6. The method of claim 1, wherein the intermittent power supply is one or more intermittent power supplies.

7. The method of claim 1, wherein the operating condition is one or more operating conditions.

8. The method of claim 1, wherein the electric power grid has coupled thereto a continuous power supply.

9. The method of claim 8, further comprising controlling a delivered power output of the continuous power supply to further control the operating condition of the electric power grid.

10. The method of claim 9, wherein the delivered power output of the continuous power supply is a delivered reactive power output.

11. The method of claim 8, further comprising generating a forecast of an available power output of the continuous power supply.

12. The method of claim 11, wherein the controlling of the delivered power output of the continuous power supply is based on the forecast.

13. The method of claim 8, wherein the continuous power supply is one or more continuous power supplies.

14. The method of claim 8, wherein the continuous power supply is a thermal power supply.

15. The method of claim 8, wherein the continuous power supply is a hydro-electric power supply.

16. The method of claim 1, wherein the electric power grid has coupled thereto a controllable load.

17. The method of claim 16, further comprising controlling a power consumption of the controllable load to further control the operating condition of the electric power grid.

18. The method of claim 17, wherein the power consumption of the controllable load is a reactive power consumption.

19. The method of claim 16, wherein the controllable load is one or more controllable loads.

20. The method of claim 1, wherein the electric power grid has coupled thereto an energy storage device.

21. The method of claim 20, further comprising controlling a delivered power output of the energy storage device to further control the operating condition of the electric power grid.

22. The method of claim 20, wherein the energy storage device is one or more energy storage devices.

23. The method of claim 1, wherein the actual environmental value is monitored by a sensor.

24. The method of claim 23, wherein the sensor is located at the location proximate the intermittent power supply.

25. The method of claim 1, wherein the electric power grid is a utility grid.

26. An energy variability controller for controlling an operating condition of an electric power grid, the electric power grid having an intermittent power supply coupled thereto, the energy variability controller comprising:
   a processor coupled to memory; and,
   at least one of hardware and software modules within the memory and controlled or executed by the processor, the modules including computer readable instructions executable by the processor for causing the energy variability controller to implement the method of claim 1.

* * * * *